(12) United States Patent
Xu et al.

(10) Patent No.: US 9,826,450 B2
(45) Date of Patent: Nov. 21, 2017

(54) METHOD FOR SUPPORTING SIPTO

(71) Applicant: Samsung Electronics Co., Ltd., Gyeonggi-do (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/244,835

(22) Filed: Apr. 3, 2014

(65) Prior Publication Data
US 2014/0301364 A1  Oct. 9, 2014

(30) Foreign Application Priority Data

Apr. 3, 2013  (CN) .......................... 2013 1 0116134
Apr. 8, 2013  (CN) .......................... 2013 1 0119608
May 17, 2013 (CN) .......................... 2013 1 0185117
Aug. 5, 2013  (CN) .......................... 2013 1 0337176

(51) Int. Cl.
*H04W 36/00* (2009.01)
*H04W 36/12* (2009.01)
*H04W 76/06* (2009.01)

(52) U.S. Cl.
CPC ........ *H04W 36/12* (2013.01); *H04W 36/0061* (2013.01); *H04W 76/062* (2013.01)

(58) Field of Classification Search
None
See application file for complete search history.

(56) References Cited

U.S. PATENT DOCUMENTS

| | | | |
|---|---|---|---|
| 2011/0075675 A1* | 3/2011 | Koodli | H04L 12/14 370/401 |
| 2011/0274087 A1 | 11/2011 | Liang et al. | |
| 2012/0184266 A1 | 7/2012 | Faccin et al. | |
| 2012/0257598 A1* | 10/2012 | Karampatsis | H04W 8/082 370/331 |
| 2013/0010754 A1* | 1/2013 | Xu | H04W 76/06 370/331 |
| 2013/0258967 A1* | 10/2013 | Watfa | H04W 76/00 370/329 |

(Continued)

FOREIGN PATENT DOCUMENTS

WO  WO 2013/009053 A2  1/2013

OTHER PUBLICATIONS

Gupta, et al, "LTE Advanced—LIPA and SIPTO", 2012, Aricent, pp. 1-10.*

(Continued)

*Primary Examiner* — Robert C Scheibel

(57) ABSTRACT

The present application discloses a method for supporting a selected IP traffic offload (SIPTO) by a mobility management entity (MME) when a user equipment (UE) handovers from a source base station to a target base station in a mobile communication system. The method includes acquiring a local home network identifier (ID) of the source base station, acquiring a local home network ID of the target base station from the target base station, and determining whether the UE has moved out of the local home network of the source base station according to the local home network ID of the source base station and the local home network ID of the target base station.

15 Claims, 17 Drawing Sheets

(56) References Cited

U.S. PATENT DOCUMENTS

| | | | | |
|---|---|---|---|---|
| 2014/0113637 A1* | 4/2014 | Guan | ............... | H04W 8/082 455/437 |
| 2014/0177590 A1* | 6/2014 | Sirotkin | ............ | H04W 52/0225 370/331 |
| 2014/0293882 A1* | 10/2014 | Choi | ................ | H04W 76/04 370/329 |
| 2015/0146532 A1* | 5/2015 | Stojanovski | .......... | H04L 5/0085 370/235 |

OTHER PUBLICATIONS

International Search Report dated Jul. 28, 2014 in connection with International Patent Application No. PCT/KR2014/002874, 3 pages.
Extended European Search Report dated Aug. 28, 2014 in connection with European Patent Application No. 14163400.6, 12 pages.
Samsung, "Resolve the Open Issues for SIPTOLAMBDAN", S2-124290, 3rd Generation Partnership Project (3GPP), SA WG2 Meeting #94, New Orleans, Louisiana, Nov. 12-16, 2012, 5 pages.
Huawei, et al., "Connected State Mobility of Local PDN Connection for SIPTOLAMBDAN", S2-124457, 3rd Generation Partnership Project (3GPP), SA WG2, New Orleans, Louisiana, Nov. 12-16, 2012, 2 pages.
Catt, "SIPTOLAMBDAN Deactiviation", 3GPP, S2.124352, SA WG2 Meeting #94, New Orleans, Louisiana, Nov. 12-16, 2012, 3 pages.
Samsung, "Limonet Issues", 3GPP, S2-133256, SA WG2 Meeting #99, Xiamen, China, Sep. 23-27, 2013, 3 pages.
Samsung, "LHN ID Aspects for Bearer Deactivation and GW Selection", 3GPP TSG-RAN WG3 Meeting #81bis, R3-131841, Venice, Italia, Oct. 7-11, 2013, 3 pages.
3GPP TR 23.859 V12.0.0, "3rd Generation Partnership Project; Technical Specification Group Services and System Aspects; Local IP Access (LIPA) Mobility and Selected IP Traffic Overload (SIPTO) at the Local Network (Release 12)", Mar. 2013, 68 pages.

* cited by examiner

METHOD FOR SUPPORTING SIPTO

CROSS-REFERENCE TO RELATED APPLICATION(S) AND CLAIM OF PRIORITY

The present application is related to and claims priority from and the benefit under 35 U.S.C. §119(a) of Chinese Patent Application No. 201310116134.5 filed on Apr. 3, 2013, Chinese Patent Application No. 201310119608.1 filed Apr. 8, 2013, Chinese Patent Application No. 201310185117.7 filed May 17, 2013 and Chinese Patent Application No. 201310337176.1 filed Aug. 5, 2013, which are hereby incorporated by reference for all purposes as if fully set forth herein.

TECHNICAL FIELD

The present disclosure relates to mobile communication system, more particularly to a method for supporting SIPTO.

BACKGROUND

FIG. 1 illustrates a schematic diagram showing architecture of System Architecture Evolution (SAE). In FIG. 1, user equipment (UE) 101 is a terminal device used for receiving data. Evolved universal terrestrial radio access network (E-UTRAN) 102 is a radio access network, which includes a macro base station (eNB) who provides a wireless network interface for the UE. Mobility management entity (MME) 103 is responsible for managing mobile contexts, session contexts and security information of the UE. Service gate way (SGW) 104 primarily provides a function of a user plane. MME 103 and SGW 104 may be in a same physical entity. Packet data network gateway (PGW) 105 is responsible for functions of charging, lawful intercepting, and the like, which may also be in a same physical entity with SGW 104. Policy and charging rule function entity (PCRF) 106 provides quality of service (QoS) policy and charging rules. General packet radio traffic support node (SGSN) 108 is a network node device that provides a route for data transmission in the universal mobile telecommunications system (UMTS). Home subscriber server (HSS) 109 is a home reverter subsystem of the UE, responsible for protect user information including location of the user equipment, an address of serving node, user security information, packet data context of the user equipment, and the like.

As the rate of the UE traffic data increases, operators provide a new technology referred to as Selected IP Traffic Offload (SIPTO). That is, when the UE accesses a service, the UE handovers to an access point which is closer to the radio access network during its movement, thereby the investment cost of transmission network can be effectively reduced, and a better service experience for the high data rate can be provided.

In 3GPP, a need for the capabilities of the network to support SIPTO and local IP accessing (LIPA) is proposed. There are two architectures for SIPTO in the local network and both of the two architectures can be used not only in H(e)NB but also in eNB.

Architecture I: independent LGW, SGW and LGW are on a same entity. LGW is in a local network. Multiple (H)eNBs may be in one local network. During the service actuation, the (H)eNB sends a local home network ID to which the (H)eNB belongs to a MME. During the movement of the UE, the MME gets to know whether the UE has moved out of the local network according to the identity of the local network received from the (H)eNB in the tracking area update TAU process, thereby can initiate a bearer disconnection process.

Architecture II: As shown in FIG. 2, LGW and (H)eNB are on one entity. The SGW is in the operator's network. This architecture is the same as the architecture of LIPA, and the process of the SIPTO service activation is also the same as that of LIPA. Currently, both SIPTO and LIPA do not support service continuity in the handover process. It may need to release the SIPTO bearer or the LIPA bearer during a handover process. The bearer deactivation process of SIPTO is different from that of LIPA. The bearer deactivation of LIPA is initiated by the source HeNB before the handover. The bearer deactivation of SIPTO is initiated by the source HeNB after the handover.

The prior SIPTO mechanism still have the following problems:

In the embodiment of architecture I, when moving within a same MME, if the UE has not moved out of the TA list, the UE will not initiate a TAU process. Thus as the MME is not aware that the UE has moved out of the local area, the MME will not initiate a bearer disconnection process. In this embodiment, even though the UE has already moved out of the local network, the UE still communicates through LGW of the local network.

In the embodiment of architecture I, when moving between different MMEs, as the source MME is not aware of the local network in which the target base station is located, the source MME does not know whether the UE has moved out of the local network of the source. Thus it is not able to trigger a SIPTO bearer disconnection process.

In the embodiment of architecture I, when moving between different MMEs, the target MME does not know whether the UE moves within the local network, if the UE moves within the local network, the target MME probably may choose a new SGW due to some reasons, for example the load balancing, which causes the traffic on SIPTO bearer not capable of ensuring the continuity. Or when the UE has already moved out of the local network of the source base station, the MME does not select a new SGW for the UE. When moving in the same MME and the selection of SGW is before TAU, if the MME does not know the local network in which the target base station is located before TAU, this problem exists as well.

In the embodiment of architecture II, the bearer deactivation method of SIPTO is different from that of LIPA. The base station does not know the established bearer is LIPA or SIPTO, thus not capable to correctly trigger the deactivation process.

SUMMARY

To address the above-discussed deficiencies, it is a primary object to provide a method for supporting SIPTO. By applying this method, it is capable of determining whether the UE has moved out the local network of the source base station, therefore a bearer disconnection process can be correctly triggered, resources can be timely released or an SGW can be accurately selected.

To achieve the above object, the technical scheme of the present disclosure will be discussed in detail below:

A method for supporting SIPTO includes the following operations. A UE moves in a same MME when the UE handovers from a source base station to a target base station. The method includes sending, by the target base station, a local home network id of the target base station to the MME when the target base station is in a local home network. The method also includes determining, by the MME, whether the UE has moved out of a local home network to which the source base station belongs according to a local home network id of the source base station and the local home network id of the target base station.

A method for supporting SIPTO includes the following operations. A UE moves in a same MME when the UE handovers from a source base station to a target base station. The method includes sending, by the target base station, information about whether the UE moves within the local home network or has moved out of the local home network, and/or a local home network id of the target base station to the MME. The method also includes determining, by the MME, whether to trigger an SIPTO bearer disconnection process or to reselect an SGW according to the information about whether the UE moves within the local home network or has moved out of the local home network.

A method for supporting SIPTO includes the following operations. A UE moves in a same MME when the UE handovers from a source base station to a target base station. The method includes acquiring, by the source base station, a local home network id of the target base station when the target base station belongs to a local home network. The method also includes sending, by the source base station, the identity of the local home network to the MME. The method also includes determining, by the MME, whether the UE has moved out of a local home network to which the source base station belongs according to a local home network id of the source base station and the local home network id of the target base station.

A method for supporting SIPTO includes the following operations. A UE moves between different MMES when the UE handovers from a source base station to a target base station. The method includes sending, by the target base station, a local home network id of the target base station to a target MME on condition that the target base station belongs to a local home network. The method also includes sending, by the target MME, the local home network id of the target base station received to a source MM. The method also includes determining, by the source MME, whether the UE has moved out of a local home network to which the source base station belongs according to a local home network id of the source base station and the local home network id of the target base station. The method also includes initiating, by the source MME, a SIPTO bearer disconnection process on condition that the UE has moved out of the local home network to which the source base station belongs.

A method for supporting SIPTO includes the following operations. A UE moves between different MMES when the UE handovers from a source base station to a target base station. The method includes sending, by the source MME, the local home network id of the source base station to the target MME. The method also includes acquiring, by the target MME, the local home network id of the target base station on condition that the target base station belongs to a local home network. The method also includes determining, by the target MME, whether the UE has moved out of the local home network to which the source base station belongs according to the local home network id of the source base station and the local home network id of the target base station.

A method for supporting SIPTO including the following operations. A UE moves between different MMES in a tracking area update TAU process. The method includes sending, by a target base station, a local home network id of the target base station to a new MME on condition that the target base station belongs to a local home network. The method also includes sending, by the new MME, the local home network id of the target base station to an old MME. The method also includes determining, by the old MME, whether the UE has moved out of the local home network to which the source base station belongs according to the local home network id of the target base station and a local home network id of the source base station.

A method for supporting SIPTO including the following operations. A UE moves between different MMES in a tracking area update TAU process. The method includes sending, by a target base station, a local home network id of the target base station to a new MME on condition that the target base station belongs to a local home network. The method also includes sending, by an old MME, the local home network id of the source base station to the new MME. The method also includes determining, by the new MME, whether the UE has moved out of the local home network to which the source base station belongs according to the local home network id of the source base station and the local home network id of the target base station.

A method for supporting SIPTO includes the following operations. A UE moves between different MMES when the UE handovers from a source base station to a target base station. The method includes acquiring, by the source base station, a local home network id of the target base station on condition that the target base station belongs to a local home network; sending, by the source base station, the local home network id of the target base station to a source MME. The method also includes determining, by the source MME, whether the UE has moved out of the local home network to which the source base station belongs according to the local home network id of the source base station and the local home network id of the target base station.

A method for supporting SIPTO includes the following operations. A UE moves between different MMES when the UE handovers from a source base station to a target base station. The method includes acquiring, by the source base station, a local home network id of the target base station on condition that the target base station belongs to a local home network; sending, by the source base station, the local home network id of the target base station to a source MME. The method also includes sending, by the source MME, the local home network id of the source base station and the local home network id of the target base station to a target MME. The method also includes determining, by the target MME, whether the UE has moved out of the local home network to which the source base station belongs according to the local home network id of the source base station and the local home network id of the target base station.

A method for supporting SIPTO includes the following operations, wherein a UE handovers from a source base station to a target base station. The method includes determining, by the source base station, whether the UE moves within a local home network or out of the local home network. The method also includes sending, by the source base station, information about whether the UE moves within a local home network or out of the local home network to an MME. The method also includes determining, by the MME, whether to trigger an SIPTO bearer disconnection process or to reselect an SGW according to the information about whether the UE moves within the local home network or has moved out of the local home network.

In an embodiment, if the UE handovers between different MMES, the source MME sends the information about whether the UE moves within the local home network or has moved out of the local home network to a target MME. The target MME determines whether to reselect an SGW according to the information about whether the UE moves within the local home network or has moved out of the local home network.

A method is provided for supporting SIPTO bearer deactivation. The method includes informing, by an MME, a base station whether an established bearer is for LIPA or SIPTO. The method includes, when a UE handovers to a cell in another base station, triggering, by the source base station, a bearer deactivation process according to whether the bearer is for LIPA or SIPTO.

A method for supporting SIPTO includes the following operations. A UE moves in a same MME when the UE handovers from a source base station to a target base station. The method includes receiving, by the MME, a handover required message from the source base station; using, by the MME, a same SGW as that before the handover, on condition that the source base station has established a SIPTO bearer in a local home network for the UE. The method also includes acquiring, by the MME, a local home network id of the target base station when the target base station is in a local home network. The method also includes determining, by the MME, whether the UE has moved out of the local home network to which the source base station belongs according to the local home network id of the source base station and the local home network id of the target base station.

A method for supporting SIPTO includes the following operations, wherein a UE moves between different MMES when the UE handovers from a source base station to a target base station. The method includes receiving, by the source MME, the handover required message sent by the source base station; determining, by the source MME, that the source base station has established a SIPTO bearer of the local home network for the UE; sending, by the source MME, information of establishing a SIPTO bearer of the local home network for the UE to the target MME; using, by target MME, a same SGW as that before the handover. The method also includes determining, by the target MME, whether the UE has moved out of the local home network to which the source base station belongs according to the local home network id of the source base station received from the source MME and the local home network id of the target base station received from the target base station.

It can be seen from the above technical solution, in the present application, the MME obtains the local home network ids to which the target base station and the source base station belongs, and determine whether the UE has moved out of the local home network to which the source base station belongs according to a comparison result between the two identities; or the source base station determines whether the UE moves within the local home network or has moved out of the local home network, and sends the information to the MME, thereby enabling the MME to accurately determine whether it may need to trigger a SIPTO bearer disconnection process to ensure a timely resource release, or enable the target MME to select an SGW accurately.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
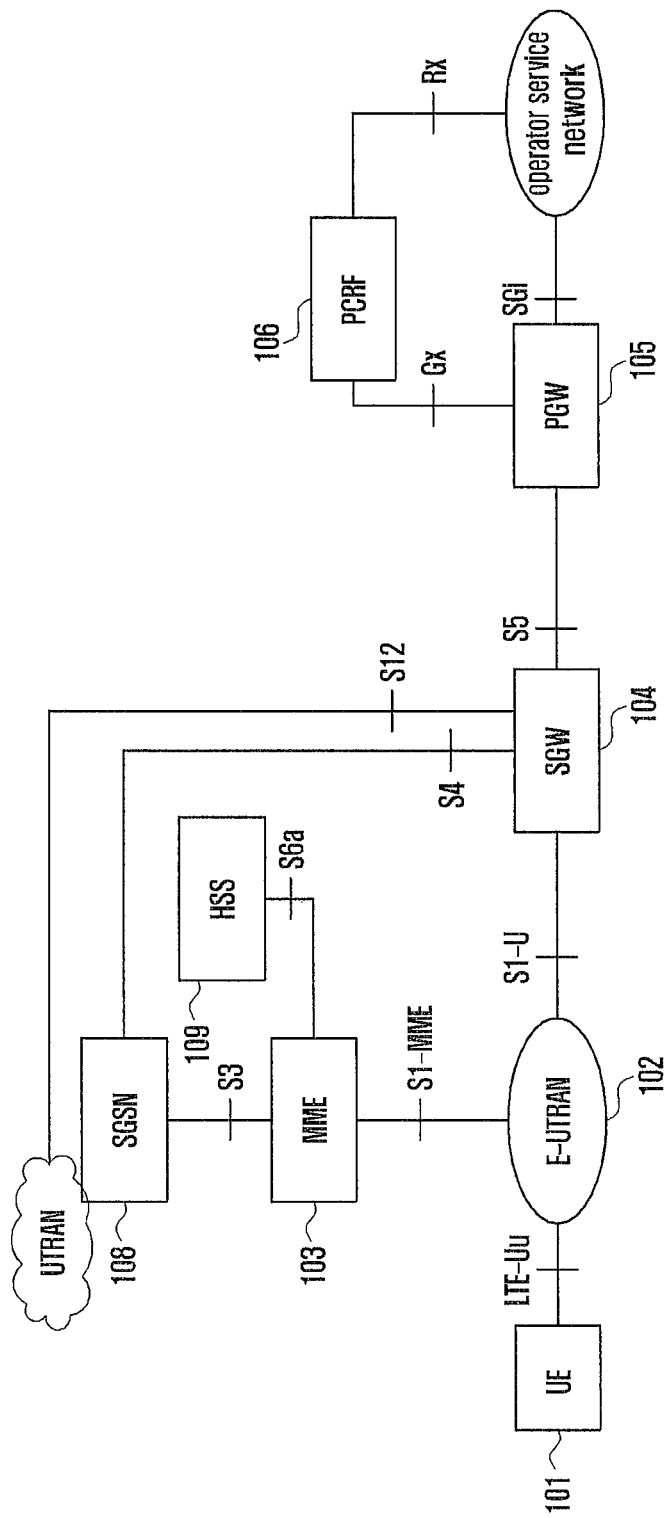
FIG. 1 illustrates a schematic diagram showing architecture of an existing SAE system.
Figure 2:
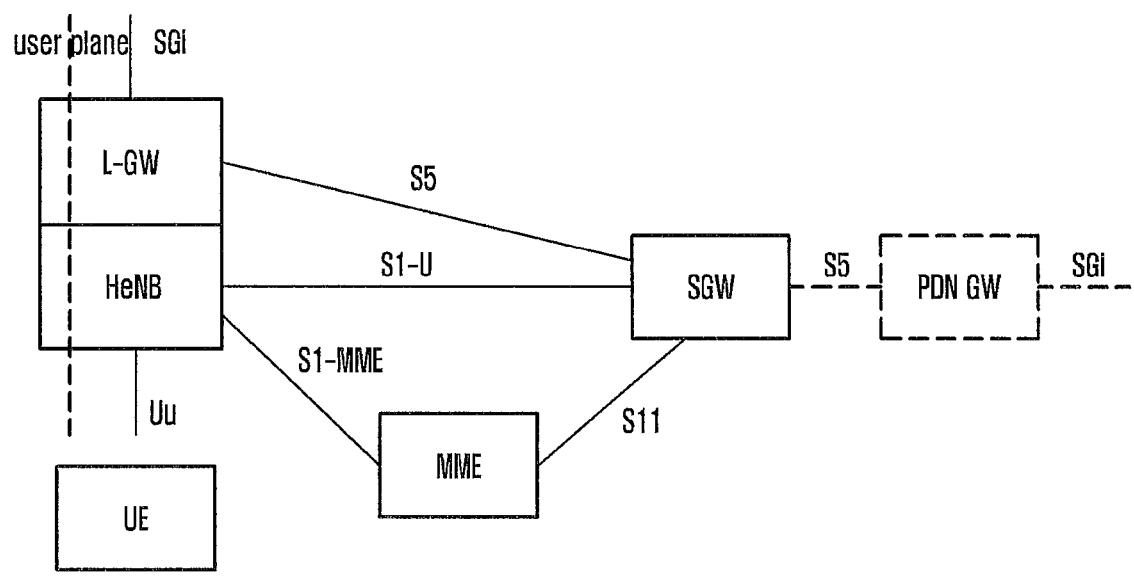
FIG. 2 illustrates a schematic diagram showing architecture of an R12 SIPTO network.

FIGS. 3 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. To make the objective, technical solutions and advantages of the present disclosure clearer, examples of the present disclosure would be described in further detail with reference to the drawings.

To solve the problems existing in the prior art, the present application provides a process of supporting SIPTO, when a UE moves within a same MME, a source base station or a target base station informs a core network of a local home network id of the target base station, enabling the core network to correctly judge whether the UE has moved out of the local home network, thereby enabling the core network to timely trigger a SIPTO bearer disconnection process, ensuring to timely release resources, or enabling the MME to determine whether it may need to reselect SGW or how to select SGW. When the UE moves between different MMES, the source base station informs the source MME of the local home network id of the target base station, or the target base station informs the source MME of the local home network id of the target base station via the target MME, enabling the core network to correctly determine whether the UE has moved out of the local network, thereby the source MME can timely trigger a SIPTO bearer disconnection process, ensuring to timely release resources, or enabling the target MME to determine whether it may need to reselect SGW or how to select SGW. Alternatively, the target base station informs the target MME of the local home network id of the target base station, and the source MME informs the target MME of the local home network id of the source base station, enabling the core network to judge whether the UE has moved out of the local home network, thereby the target MME can directly or timely informs the source MME to trigger the bearer disconnection process, ensuring a timely resource release, or enabling the target MME to determine whether it may need to reselect SGW or how to select SGW. Alternatively, the target base station sends the information about whether the UE moves within the local home network or has moved out of the local home network to MME, the MME determines whether it may need to trigger a SIPTO bearer disconnection or whether can reselect SGW according to the information whether the UE moves within the local home network or has moved out of the local home network. Or the source base station determines whether the UE moves within the local home network or the UE has moved out of the local home network, and the source base station sends the information about whether the UE moves within the local home network or the UE has moved out of the local home network to the MME, enabling the core network to correctly judge whether the UE has moved out of the local home network, thereby the source MME can timely trigger a SIPTO bearer disconnection process, ensuring a timely resource release, enabling the MME to determine whether it may need to reselect SGW or how to select SGW. When the UE moves between different MMES, the source MME sends the information about whether the UE moves within the local home network or the UE has moved out of the local home network to the target MME, thereby enabling the target MME to determine whether to reselect an SGW or how to select the SGW. The present disclosure also provides various embodiments for the base station to differentiate whether it is a LIPA bearer or a SIPTO bearer, thereby triggering a correct SIPTO bearer deactivation process, ensuring appropriately resources release.

The present disclosure also provides one or more embodiments to let the MME know whether the UE has moved out of the local network, thus the selection of SGW can be supported.

In an embodiment, when the UE moves in a same MME, the source base station or the target base station sends the local home network id of the target base station to the MME. The MME can further obtain the local home network id of the source base station from the source base station or the target base station. Therefore the MME can determine whether the UE moves within the local home network, and further determine whether it may need to reselect SGW or how to select SGW. For example, if the UE moves within the local home network, the MME do not select a new SGW for the UE. If the UE has moved out of the local home network, the MME can select a new SGW for the UE.

In another embodiment, when the UE moves between different MMES, the target base station sends the local home network id of the target base station to a target MME. The source base station send the local home network id of the source base station to the target MME via the source MME. Therefore, the target MME can determine whether the UE has moved out of the local home network, and further determine whether it may need to reselect SGW or how to select SGW. For example, if the UE moves within the local home network, the MME do not select a new SGW for the UE. If the UE has moved out of the local home network, the MME can select a new SGW for the UE.

In yet another embodiment, when the UE moves between different MMES, the source base station sends the local home network id of the target base station to the source MME. The MME can obtain the local home network id of the source base station from the source base station. The source MME sends the local home network id of the target base station and the local home network id of the source base station to the target MME. Therefore, the target MME can determine whether the UE has moved out of the local home network, and further determine whether it may need to reselect SGW or how to select SGW. For example, if the UE moves within the local home network, the MME do not select a new SGW for the UE. If the UE has moved out of the local home network, the MME can select a new SGW for the UE.

In yet another embodiment, when the UE moves between different MMES, the source base station sends the local home network id of the target base station to the source MME. The MME can further obtain the local home network id of the source base station from the source base station. Therefore the MME can determine whether the UE moves within the local home network. If yes, the source MME sends an indication indicating that the UE moves within the local home network to the target MME. Then the target MME can determine whether it may need to reselect SGW or how to select SGW. For example, if the UE moves within the local home network, the target MME does not select a new SGW for the UE. For example, if no indication indicating that the UE moves within the local home network to the target MME, the target MME do not select a new SGW for the UE.

In yet another embodiment, the source base station determines whether the UE moves within the local home network or the UE has moved out of the local home network. The source base station sends the information whether the UE moves within the local home network or the UE has moved out of the local home network to MME which enables the core network to correctly judge whether the UE has moved out of the local home network, so that the source MME can timely trigger a SIPTO bearer disconnection process, ensuring timely resources release, enabling the MME to determine whether can reselect SGW. When the UE moves between different MMES, the source MME sends the information whether the UE moves within the local home network or the UE has moved out of the local home network to the target MME, thereby enabling the target MME to determine whether can reselect SGW or how to select SGW.

In yet another embodiment, the target base station determines whether the UE moves within the local home network or the UE has moved out of the local home network. The target base station sends the information whether the UE moves within the local home network or the UE has moved out of the local home network to the MME which enables the core network to correctly judge whether the UE has moved out of the local home network, thereby enabling the MME to timely trigger a SIPTO bearer disconnection process, ensuring timely resources release, enabling the MME to determine whether can reselect SGW or how to select SGW.

In yet another embodiment, when the UE moves in the same MME, the MME receives a handover required message from the source base station, and the MME does not reselect SGW for the UE according an established SIPTO bearer in the local home network for the UE. When the handover process terminates, the MME determines whether the UE moves within the local home network or has moved out of the local home network according to the stored local home network id of the source base station and the local home network id of the target base station received from the target base station. If the UE has moved out of the local home network, the MME will trigger a SIPTO bearer disconnection process. The MME obtains the local home network id of the target base station via a handover request acknowledgement message, a handover notify message or an uplink direct transfer message.

In yet another embodiment, the UE moves between different MMES. The source MME receives a handover required message from the source base station. The source MME sends information about having established a SIPTO bearer in the local home network for the UE to the target MME. The source MME may explicitly inform the target MME information about having established a SIPTO bearer in the local home network for the UE or which bearer is the SIPTO bearer in the local home network. The source MME may inform the target MME the information about having established a SIPTO bearer in the local home network for the UE by sending the local home network id of the source base station to the target MME. In an embodiment, when the SIPTO bearer in the local network is established, the local home network id of the source base station will be included in the forward relocation request message. So that the target MME can be aware of the information about having established a local SIPTO bearer for the UE according to the local home network id included in the forward relocation request message. The target MME will not reselect SGW for the UE.

When the handover process terminates, the MME determines whether the UE moves within the local home network or has moved out of the local home network according to the local home network id of the source base station received from the source MME and the local home network id of the target base station received from the target base station. If the UE has moved out of the local home network, the MME will trigger a SIPTO bearer disconnection process. The MME obtains the local home network id of the target base station via a handover notify message or an uplink direct transfer message.

Additionally, it may also be possible to make a new MME determine whether the UE has moved out of the local home network of the source base station in a TAU process, thereby determining whether it may need to select a new SGW for the UE or how to select SGW.

Various embodiments will be discussed in detail in the embodiments illustrated in FIG. 3 to FIG. 9. Further embodiments will be illustrated in FIG. 16 and FIG. 17 respectively.

An embodiment for supporting SIPTO for solving problems of existing systems will be firstly given below. When the UE moves within a same MME, whether the UE has moved out of the local home network of the source base station can be determined in the process of the UE handover from a source base station to a target base station. In an embodiment, the target base station sends the local home network id of the target base station to the MME; the MME can obtain the local home network id of the source base station from the source base station or the target base station, and the MME determines whether the UE has moved out of the local home network of the source base station according to the local home network id of the source base station and the local home network id of the target base station. Therefore the MME can determine whether it may need to reselect an SGW or how to select SGW. The MME may initiate a SIPTO bearer disconnection process after determining that the UE has moved out of the local home network to which the source base station belongs. Another embodiment may include: the source base station sends the local home network id of the target base station to the MME; the MME can obtain the local home network id of the source base station from the source base station, and the MME determines whether the UE has moved out of the local home network in which the source base station is located according to the local home network id of the source base station and the local home network id of the target base station. Therefore the MME can determine whether it may need to reselect an SGW or how to select SGW. The MME may initiate a SIPTO bearer disconnection process after determining that the UE has moved out of the local home network in which the source base station is located. Yet another embodiment may include: the target base station determines whether the UE moves within the local home network or has moved out of the local home network, and then sends the information about whether the UE moves within the local home network or has moved out of the local home network to the MME. The MME then determines whether to trigger a SIPTO bearer disconnection process or to select an SGW according to the received information.

Figure 3:
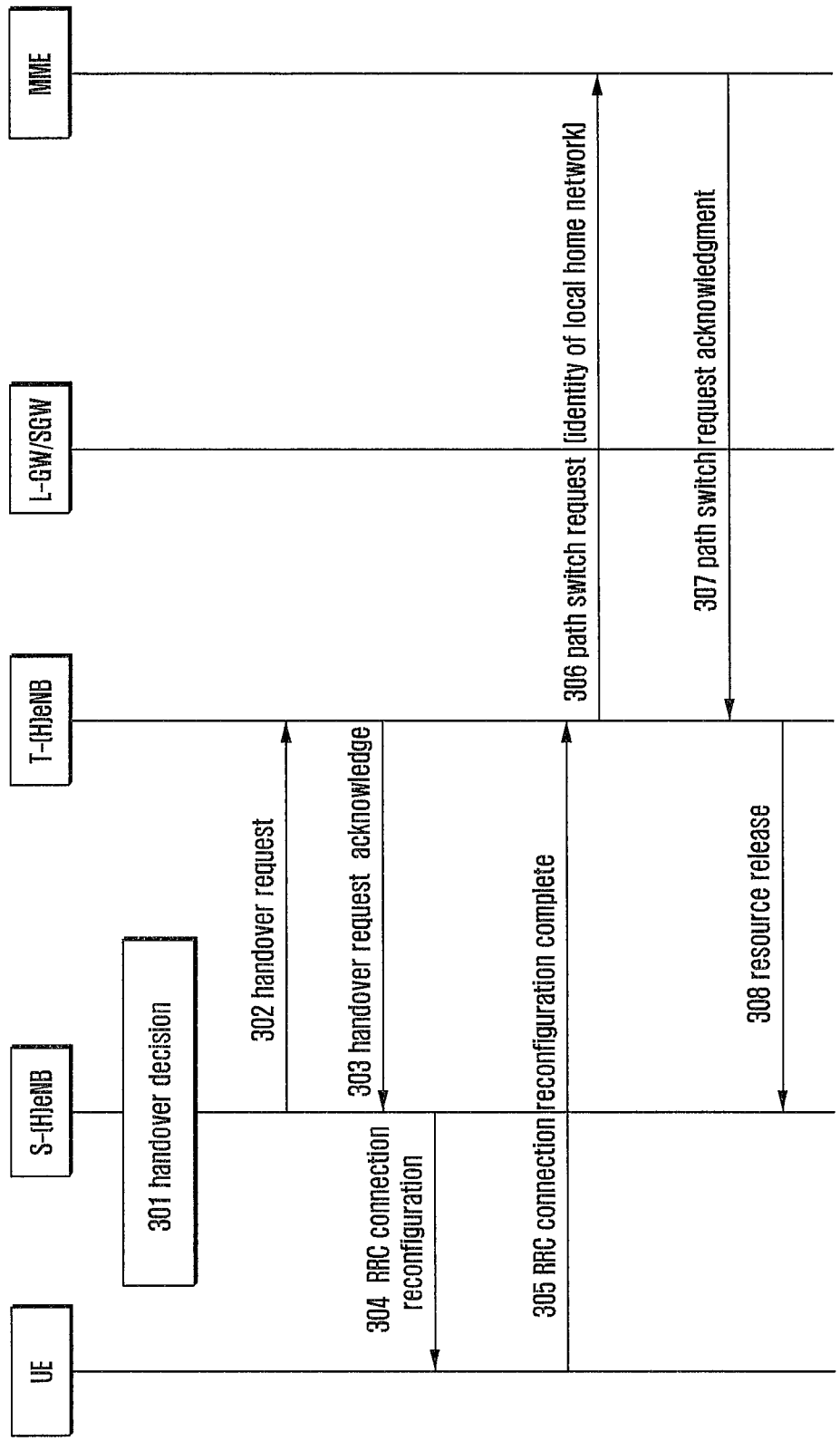
FIG. 3 illustrates a process for supporting selected IP traffic offload (SIPTO) according to an embodiment of the present disclosure.
Figure 4:
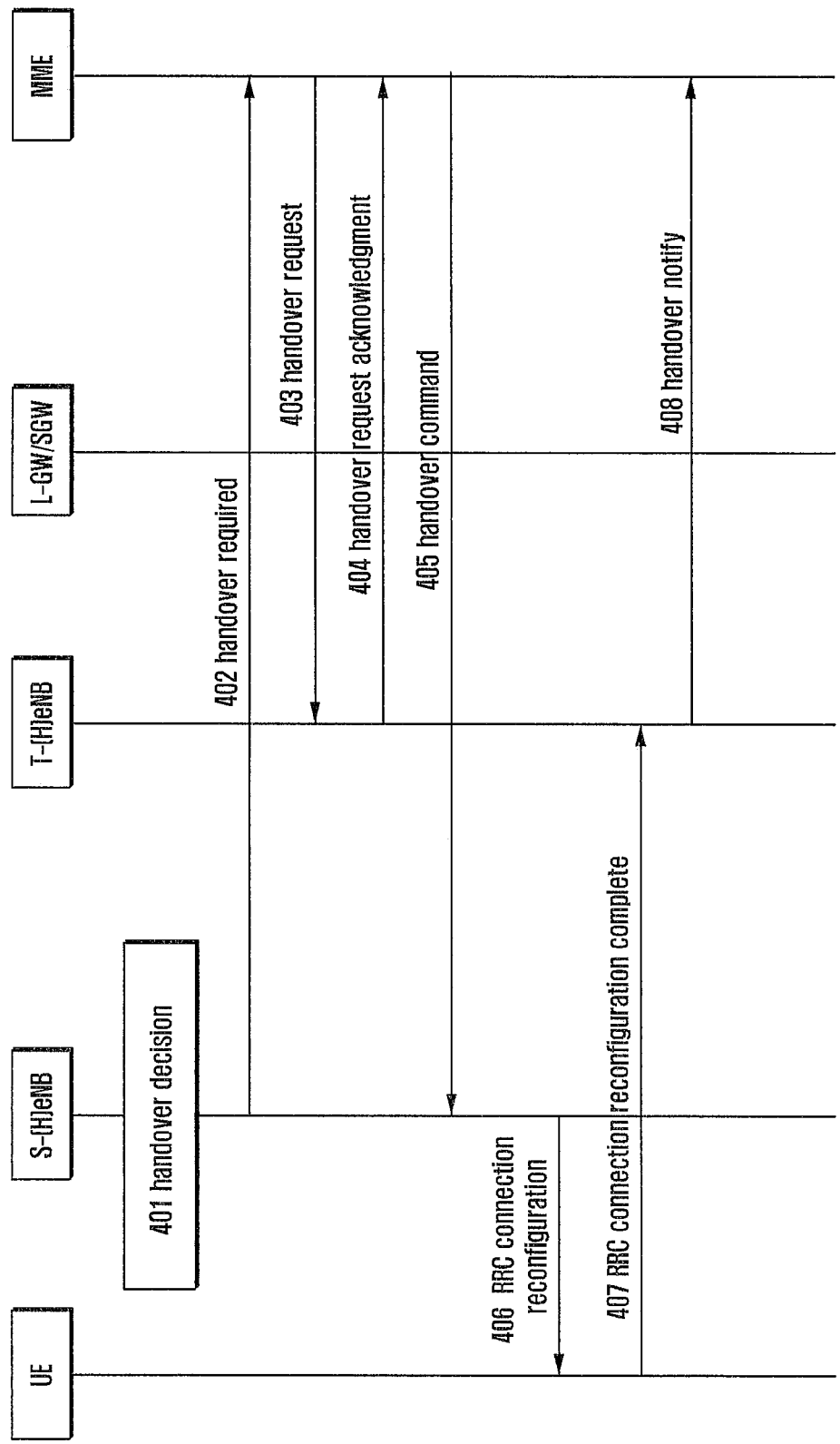
FIG. 4 illustrates a process for supporting selected IP traffic offload (SIPTO) according to an embodiment of the present disclosure.

One or more of the embodiments recognizes and takes into account the problems with prior SIPTO mechanisms. Wherein, FIG. 3 illustrates one embodiment. FIG. 4 illustrates other embodiments.

FIG. 3 illustrates a process for supporting selected IP traffic offload (SIPTO) according to an embodiment of the present disclosure. As illustrated in FIG. 3, the process includes:

In operation 301, the source (H)eNB decides to initiate a handover of the UE.

In operation 302, the source (H)eNB sends a handover request message to the target (H)eNB.

In operation 303, the target (H)eNB sends a handover request response message to the source (H)eNB.

In operation 304, the source (H)eNB sends an RRC connection reconfiguration request message to the UE.

In operation 305, the UE sends an RRC connection reconfiguration complete message to the target (H)eNB.

In operation 306, the target (H)eNB sends a path switch request message to the MME. The message contains a local home network id of the target (H)eNB.

If the target (H)eNB does not belong to any local home network, the path switch request message will not contain the local home network id.

The MME can determine whether the UE has moved out the local home network of the source (H)eNB according to the local home network id of the source (H)eNB and the local home network id of the target (H)eNB. The local home network id of the source (H)eNB is stored in the UE context. The local home network id of the target (H)eNB is received from the target (H)eNB. According to that the local home network id of the target (H)eNB and the local home network id of the source (H)eNB are different, or that the target (H)eNB is not in a local home network, the MME knows that the UE has moved out of the local home network of the source (H)eNB. If the UE has moved out of the local home network, the MME will trigger a SIPTO bearer disconnection process. If the UE moves within the local home network, the MME do not select a new SGW for the UE. If the UE has moved out of the local home network, the MME can select a new SGW for the UE.

If the target (H)eNB does not belong to any local home network, the MME would get to know that the UE has moved out of the local home network of the source (H)eNB according to the local home network id of the source (H)eNB stored in the UE context and the fact that the target (H)eNB does not belong to the local home network. Then the MME can initiate a SIPTO bearer disconnection process. The time point of the MME initiating a SIPTO bearer disconnection process and the bearer disconnection process are not of central importance to the present disclosure, which will not be described in details here.

In an embodiment, when the UE initially accesses the source (H)eNB, the MME can obtain the local home network id of the source (H)eNB according to an initial UE message received, or an uplink NAS transport message, or a path switch request message, or a handover request acknowledgement message or a handover notify message shown in FIG. 4. The MME would store the local home network id in the UE context. The MME may also obtain the local home network id of the source (H)eNB from the target (H)eNB. Corresponding to this embodiment, the target (H)eNB can obtain the identity of the local network in which the source (H)eNB is located through operation 402 or through the handover required message in operation 302. Then the target (H)eNB sends the identity of the local home network to which the source (H)eNB belongs to MME via the path switch request message. Or the target (H)eNB obtains the identity of the local home network to which the source (H)eNB belongs through operation 402 or operation 302. The target (H)eNB determines whether the UE moves within the local home network or has moved out of the local home network. Then the target (H)eNB may send information about whether the UE moves within the local home network or has moved out of the local home network to MME. The MME decides whether to trigger a SIPTO bearer disconnection process or whether to perform an SGW reselection according to the information received. When reselecting an SGW, the MME may select the SGW according to the identity of the local home network in which the target (H)eNB is located received in operation 306.

In operation 307, the MME sends a path switch request acknowledgment message to the target (H)eNB.

In operation 308, the target (H)eNB sends a resource release message to the source (H)eNB.

Thereafter, the flow depicted in FIG. 3 may terminate.

FIG. 4 illustrates a process for supporting selected IP traffic offload (SIPTO) according to an embodiment of the present disclosure. As illustrated in FIG. 4, the process may include:

In operation 401, the source (H)eNB decides to initiate a handover of the UE.

In operation 402, the source (H)eNB sends a handover to the MME.

There are two ways in this embodiment to inform the MME the local home network id of the target base station.

In an embodiment, the source base station informs the MME the local home network id of the target base station. Corresponding to this embodiment, the handover required message could include the local home network id of the target base station. Wherein the source (H)eNB has four ways to obtain the local home network id of the target base station:

In an embodiment, obtain the local home network id of the target (H)eNB via an X2 setup process. In the X2 setup process between the source (H)eNB and the target (H)eNB, the local home network id of the target (H)eNB can be obtained via an X2 setup request or an X2 setup response message;

In an embodiment, obtain the local home network id of the target (H)eNB via an S1 process. For example, the local home network id of one (H)eNB can be sent to another (H)eNB via an eNB configuration transfer and an MME configuration transfer process or other S1 messages;

In an embodiment, obtain the local home network id of the target (H)eNB via an automatic neighbor relation ANR process. The target (H)eNB broadcasts the its local home network id. The UE obtains the local home network id of the target (H)eNB from the system information block SIB broadcast by the target (H)eNB, and the UE sends the local home network id of the target (H)eNB to the source (H)eNB;

In an embodiment, obtain via the configuration of the operation and maintenance center (OAM).

The source (H)eNB can also obtain the local home network id of the target (H)eNB in other ways without affecting the primary content of the present disclosure.

When the target (H)eNB does not belong to any local home network, the local home network id of the target base station is not be included in the procedure of the four ways described above.

In an embodiment, the target base station informs the MME of the local home network id of the target base station. The embodiment will be described in operation 404 and operation 408.

In operation 403, the MME sends a handover request message to the target (H)eNB.

In operation 404, the target (H)eNB sends a handover request acknowledgment message to the MME.

There are two ways in this embodiment for the target (H)eNB to inform the MME of the local home network id of the target base station.

In an embodiment, including the local home network id of the target base station in the handover request acknowledgement message.

In an embodiment, including the local home network id of the target base station in the handover notify message in operation 408.

If the target (H)eNB does not belong to any local home network, the handover required message, the handover request acknowledgment message or the handover notify message will not contain the identity of the local home network.

After obtaining the local home network id of the target base station from the source base station (operation 402) or the target base station, the MME can determine whether the UE has moved out of the local home network to which the source (H)eNB belongs. The MME determines whether the UE has moved out the local home network of the source (H)eNB according to the local home network id of the source (H)eNB and the local home network id of the target (H)eNB. The local home network id of the source (H)eNB is stored in the UE context. The local home network id of the target (H)eNB is received from the target (H)eNB. According to that the local home network id of the target (H)eNB and the local home network id of the source (H)eNB are different, or that the target (H)eNB is not in a local home network, the MME knows that the UE has moved out of the local home network of the source (H)eNB. If the UE has moved out of the local home network of the source (H)eNB, the MME will trigger a SIPTO bearer disconnection process. For example, if the UE moves within the local home network, the MME do not select a new SGW for the UE. If the UE has moved out of the local home network, the MME can select a new SGW for the UE.

If the target (H)eNB does not belong to any local home network, the MME would get to know that the UE has moved out of the local home network of the source (H)eNB according to the identity of the local home network to which the source (H)eNB belongs stored in the UE context and the fact that the target (H)eNB does not belong to the local home network. Then the MME can initiate a SIPTO bearer disconnection process. If the UE has moved out of the local home network, the MME can select a new SGW for the UE.

In an embodiment, when the UE initially accesses the source (H)eNB, the MME can obtain the identity of the local home network to which the source (H)eNB belongs according to an initial UE message received, or an uplink NAS transport message, or a path switch request message, or a handover request acknowledgement message or a handover notify message. The MME would store the identity of the local home network in the UE context. The MME may also obtain the identity of the local home network to which the source (H)eNB belongs through operation 402. Corresponding to this embodiment, the handover required message in operation 402 could include the identity of the local network in which the source (H)eNB is located. Or the source (H)eNB obtains the identity of the local home network in which the target (H)eNB is located through operation 402. The source (H)eNB determines whether the UE moves within the local home network or has moved out of the local home network. Then the source (H)eNB may send information about whether the UE moves within the local home network or has moved out of the local home network to the MME. The MME then decides whether to trigger a SIPTO bearer disconnection process or whether to perform an SGW reselection according to the information received. When reselecting an SGW, the MME may select the SGW according to the identity of the local home network in which the target (H)eNB is located received in operation 402 or operation 404.

In operation 405, the MME sends a handover command message to the source (H)eNB.

Operations 406 to 407 are the same with operations 304 to 305. Therefore operations 406 to 407 will not be described here redundantly.

In operation 408, the target (H)eNB sends a handover notify message to the MME. When informing the MME of the local home network id of the target (H)eNB by the target (H)eNB in this embodiment, the handover notify message may contain the local home network id of the target (H)eNB. If the target (H)eNB does not belong to any local home network, the handover notify message will not contain the local home network id. The behavior of the MME is the same as that described in operation 404, which will not be described here again. If the target (H)eNB does not belong to any local home network, the MME would get to know that the UE has moved out of the local home network according to the local home network id of the source (H)eNB stored in the UE context and the fact that the target (H)eNB does not belong to the local home network. Then the MME can initiate a SIPTO bearer disconnection process. The time point of the MME initiating a SIPTO bearer disconnection process and the bearer disconnection process are not of central importance to the present disclosure, which will not be described in details here.

Thereafter, the flow depicted in FIG. 4 may terminate.

An embodiment for supporting SIPTO for solving problems of existing systems will be given below. When the UE moves between different MMES, in the process of the UE handover from the source base station to the target base station or in the TAU process, whether the UE has moved out of the local home network of the source base station can be determined, thereby the judgment of the SIPTO bearer disconnection or the SGW selection can be made accurately. One or more embodiments providing solutions of solving problems of existing systems will be described below.

Figure 5:
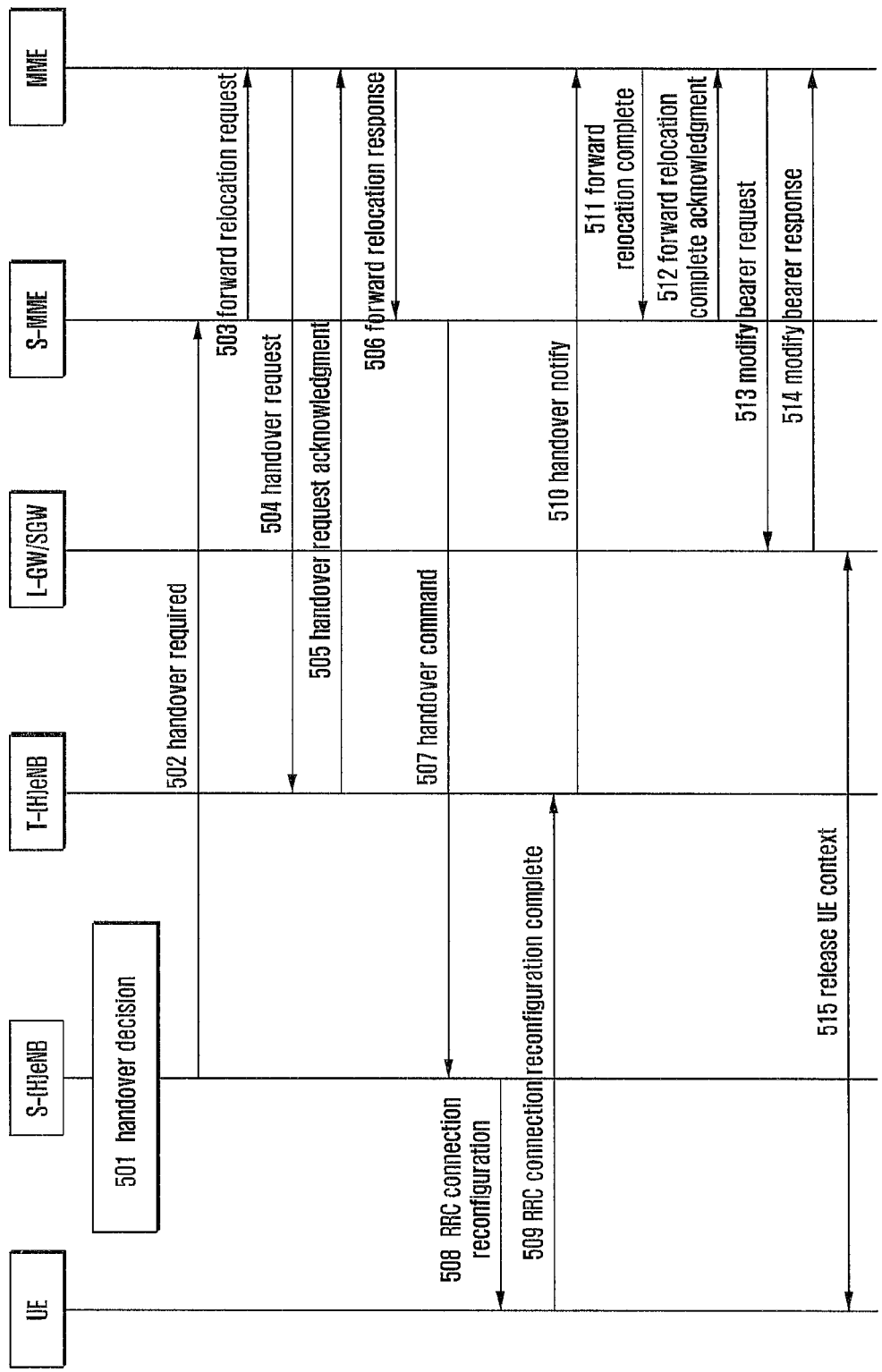
FIG. 5 illustrates a process for supporting selected IP traffic offload (SIPTO) according to an embodiment of the present disclosure.

FIG. 5 illustrates a process for supporting selected IP traffic offload (SIPTO) according to an embodiment of the present disclosure. In this embodiment, the target base station sends the local home network id of the target (H)eNB to the target MME. The target MME sends the local home network id of the target (H)eNB to the source MME. Therefore, the source MME can determines whether it may need to trigger the disconnection process of the SIPTO bearer according to this information and the local home network id of the source (H)eNB. As illustrated in FIG. 5, the process may include:

In operation 501, the source (H)eNB decides to initiate a handover of the UE.

In operation 502, the source (H)eNB sends a handover to the source MME.

In operation 503, the source MME sends a forward relocation request message to the target MME.

In operation 504, the target MME sends a handover request message to the target (H)eNB.

In operation 505, the target (H)eNB sends a handover request acknowledgment message to the target MME.

There are two ways in this embodiment for the target (H)eNB to inform the target MME of the local home network id of the target (H)eNB. Same as the description about FIG. 4, the two ways will be described in details.

In an embodiment, the target (H)eNB informs the target MME of the local home network id of the target (H)eNB via the handover request acknowledgment message.

In an embodiment, the target (H)eNB informs the target MME of the local home network id of the target (H)eNB via the handover notify message in operation 510.

In operation 506, the target MME sends a forward relocation response message to the source MME.

There are three ways in this embodiment for the target MME to inform the source MME of the local home network id of the target (H)eNB.

In an embodiment, the target MME informs the source MME of the local home network id of the target (H)eNB via the forward relocation response message. Corresponding to this embodiment, the forward relocation response message includes the local home network id of the target (H)eNB. This embodiment is suitable when the target (H)eNB informs the target MME of the local home network id of the target (H)eNB via the handover notify message in operation 510.

In an embodiment, the target MME informs the source MME of the local home network id of the target (H)eNB via the forward relocation complete message in operation 511. Corresponding to this embodiment, the forward relocation complete message includes the local home network id of the target (H)eNB.

In an embodiment, after receiving the local home network id of the target (H)eNB, the target MME informs the source MME of the local home network id of the target (H)eNB via a new message. After receiving the local home network id of the target (H)eNB, the target MME may inform the source MME of the local home network id of the target (H)eNB in any stage in the handover process or via a new message after the handover process is complete.

The source MME would get to know whether the UE has moved out of the local home network by comparing the local home network id of the target (H)eNB received from the target MME with the local home network id of the source (H)eNB stored in the UE context. When the target (H)eNB does not belong to any local network, the target (H)eNB may not need to inform the target MME of the local network information. The target MME may not need to inform the source MME of the local network information. Without receiving the local network information from the target MME, the source MME would know that the UE has moved out of the local network. If the UE has moved out of the local network, the source MME will trigger a SIPTO bearer disconnection process. In an embodiment, when the UE initially accesses the source (H)eNB, the MME can obtain the local home network id of the source (H)eNB according to an initial UE message received, or an uplink NAS transport message, or a path switch request message, or a handover request acknowledgement message or a handover notify message. The MME would store the local home network id of the source (H)eNB in the UE context. The MME may also obtain the local home network id of the source (H)eNB through operation 502. Corresponding to this embodiment, the handover required message in operation 502 could include the local home network id of the source (H)eNB.

In operation 507, the source MME sends a handover command message to the source (H)eNB.

Operations 508 to 510 are the same as operations 406 to 408. Therefore operations 508 to 510 will not be described here again.

In operation 511, the target MME sends a forward relocation complete message to the source MME. The message may contain the local home network id of the target (H)eNB. Details of the message are as described in operation 506 and will not be described here again.

In operation 512, the source MME sends a forward relocation complete acknowledgment message to the target MME.

Operation 513, the target MME sends a modify bearer request message to an LGW/SGW.

Operation 514, the LGW/SGW sends a modify bearer response message to the target MME.

Operation 515, the source MME triggers a resource release process of the source (H)eNB.

Thereafter, the flow depicted in FIG. 5 may terminate.

Figure 6:
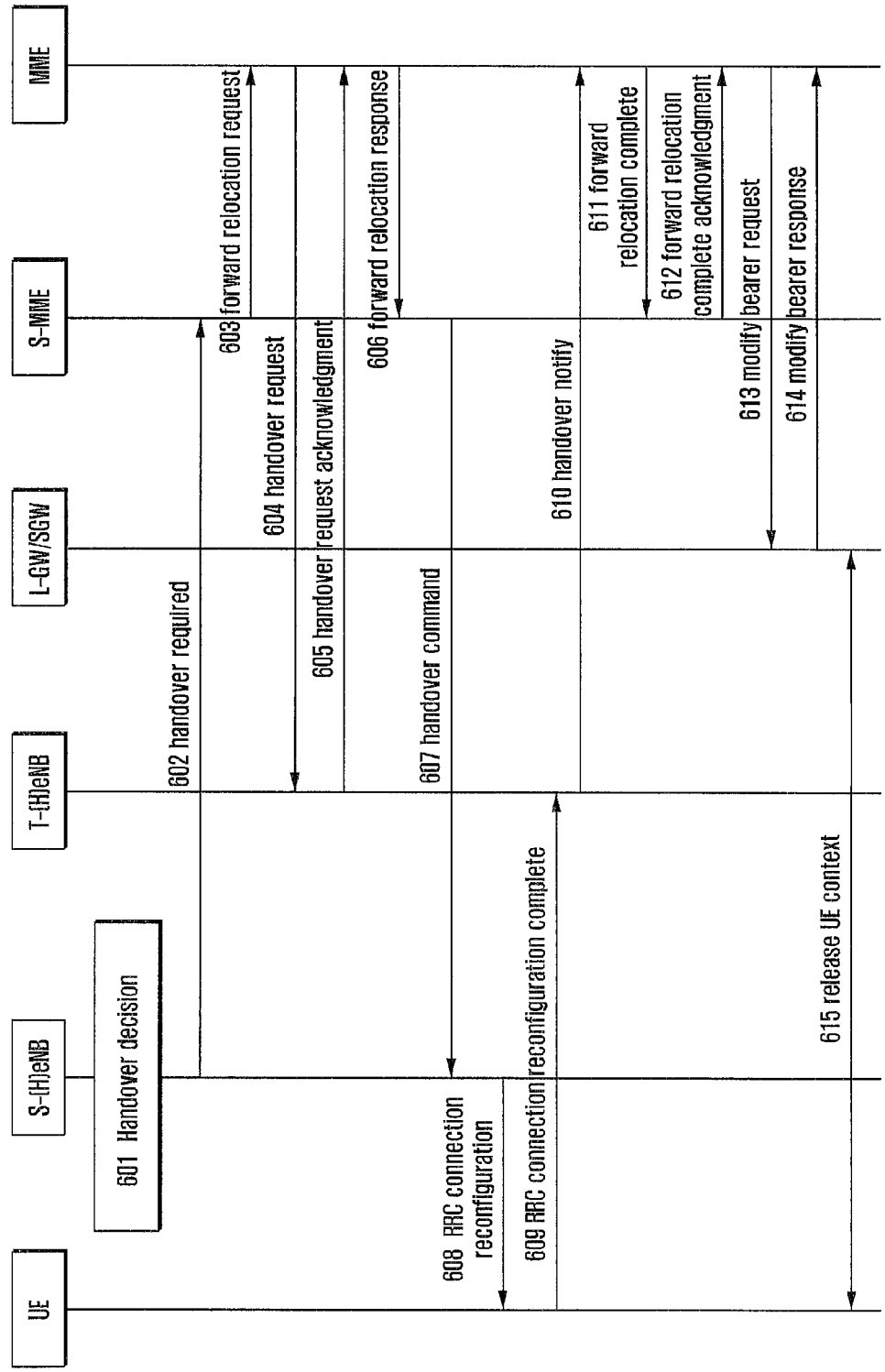
FIG. 6 illustrates a process for supporting selected IP traffic offload (SIPTO) according to an embodiment of the present disclosure.

FIG. 6 illustrates a process for supporting selected IP traffic offload (SIPTO) according to an embodiment of the present disclosure. In this embodiment, the source MME sends the local home network id of the source (H)eNB to the target MME. The target MME determines whether the UE has moved out of the local network to which the source base station belongs according to a comparison between the local home network id of the source (H)eNB and the local home network id of the target (H)eNB. If the UE has moved out, the target MME will send a SIPTO bearer disconnection indication to the source MME. Therefore, the source MME may trigger the SIPTO bearer disconnection process. This embodiment can solve a problem of existing systems. The source MME sends the local home network id of the source (H)eNB to the target MME. The target MME gets to know the local home network id of the target base station in a S1 setup process, through configuration information, by querying the target base station or through other ways, thereby whether the target base station and the source base station are in the same local home network can be determined. And if they are in the same local home network, the target MME will not select a new SGW for the UE. While if the UE has moved out of the local home network to which the source base station belongs, the target MME can select a new SGW for the UE. As illustrated in FIG. 6, the process may include:

Operations 601 to 602 are the same with operations 501 to 502. Therefore operations 601 to 602 will not be described here redundantly.

In operation 603, the source MME sends a forward relocation request message to the target MME.

To solve a problem of existing systems, there are three ways for the source MME to inform the target MME of the local home network id of the source (H)eNB, which includes:

In an embodiment, the source MME informs the target MME of the local home network id of the source (H)eNB via the forward relocation request message.

In an embodiment, the source MME informs the target MME of the local home network id of the source (H)eNB via the forward relocation complete acknowledgment message.

In an embodiment, the source MME informs the target MME of the local home network id of the source (H)eNB via other messages or a new message.

The source MME would obtain the local home network id of the source (H)eNB according to an initial UE message, or an uplink NAS transport message, or a handover request acknowledgment message, or a handover notify message, or a path switch request message. The MME would store the identity of the local home network in the UE context. The MME may also obtain the local home network id of the source (H)eNB through operation 602. Corresponding to this embodiment, the handover required message in operation 602 could include the local home network id of the source (H)eNB.

The target MME gets to know the local home network id of the target (H)eNB via an S1 setup process, or configuration of the operation and maintenance OAM, or through operation 605 or operation 610, or via a query process to the target base station. Corresponding to the embodiment that the MME obtains the identity of the local network to which the base station belongs via the S1 setup process, the S1 setup request message sent from the base station to the MME may include the local home network id. The embodiment of obtaining the local home network id of the target base station via querying the target base station may include: the MME sends a query request to the base station; the base station sends a query response message to the MME, wherein the query response includes the identity of the local home network to which the base station belongs. The query request may be a non-UE dedicated signaling process or a UE dedicated process. The message corresponding to the non-UE dedicated signaling process is sent through a non-UE associated signaling connection. The message corresponding to the UE dedicated signaling process is sent through a UE associated signaling connection. Corresponding to the embodiment of the UE dedicated process, a query request may trigger the establishment of a UE associated signaling connection, wherein the query request includes MME UE S1 AP ID, and the query response includes eNB UE S1 AP ID and MME UE S1 AP ID.

The target MME determines whether the UE has moved out of the local home network according to a comparison result between the local home network id of the source (H)eNB and the local home network id of the target (H)eNB. If the target MME does not receive the local home network identity from the target (H)eNB, it can be determined that the (H)eNB does not belong to any local home network. The MME can determine that the UE has moved out of the local network.

The target MME may send a SIPTO bearer disconnection indication to the source MME on condition that the UE has moved out of the local network to which the source base station belongs. In this embodiment, there are three ways for the target MME to send the SIPTO bearer disconnection indication to the source MME, which includes:

In an embodiment, through a forward relocation response in operation 606;

In an embodiment, through a forward relocation notification in operation 611;

In an embodiment, through other existing messages of a new message.

To solve a problem of existing systems, the source MME informs the target MME of the local home network id of the source (H)eNB via the forward relocation request message. The target MME gets to know the local home network id of the target (H)eNB via an S1 setup process, configuration of the operation and maintenance OAM, a query process to the target base station or other ways. Therefore, the target MME can determine whether the target base station and the source base station are in the same local home network, thereby selecting an SGW accurately. Corresponding to the embodiment that the MME obtains the identity of the local network to which the base station belongs via the S1 setup process, the S1 setup request message sent from the base station to the MME may include the identity of the local home network to which the base station belongs.

In operation 604, the target MME sends a handover request message to the target (H)eNB.

In operation 605, the target (H)eNB sends a handover request acknowledgment message to the target MME. The message contains an local home network id of the target (H)eNB as described in operations 404.

In operation 606, the target MME sends a forward relocation response message to the source MME.

Operations 607 to 610 are the same as operations 405 to 408. Therefore operations 607 to 610 will not be described here again.

In operation 611, the target MME sends a forward relocation complete message to the source MME.

In operation 612, the source MME sends a forward relocation complete acknowledgment message to the target MME.

Operations 613 to 615 are the same as operations 513 to 515. Therefore operations 613 to 615 will not be described here again.

Thereafter, the flow depicted in FIG. 6 may terminate.

Figure 7:
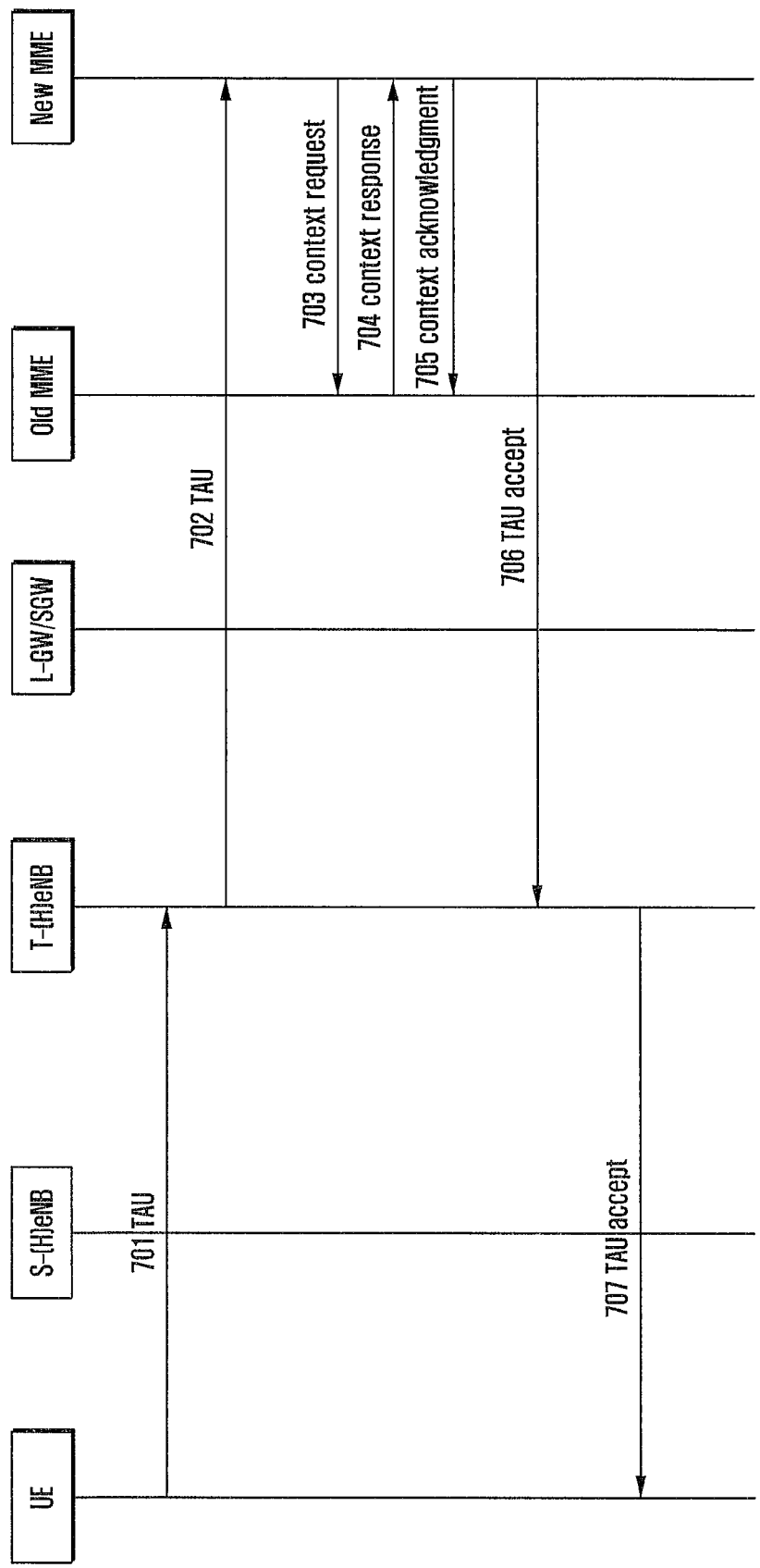
FIG. 7 illustrates a process for supporting selected IP traffic offload (SIPTO) according to an embodiment of the present disclosure.

FIG. 7 illustrates a process for supporting selected IP traffic offload (SIPTO) according to an embodiment of the present disclosure. In this embodiment, the new MME sends the local home network id of the target (H)eNB to the old MME in the TAU process. Therefore, the old MME can determines whether it may need to trigger the disconnection process of the SIPTO bearer according to this information and the local home network id of the source (H)eNB stored in the UE context.

In an embodiment, the old MME sends the local home network id of the source (H)eNB to the new MME, and the new MME determines whether the target base station is in the local home network to which the source base station belongs according to the local home network id of the target base station received from the target base station and the local home network id of the source base station received from the old MME, thereby deciding to select the SGW. For example, if the UE moves in the local home network, the new MME may not select a new SGW for the UE; if the UE does not move in the local home network, the new MME can select a new SGW for the UE.

In another embodiment, the new MME sends the local home network id of the target (H)eNB to the old MME, so that the old MME can judge whether the UE moves within the local network according to this information and the local home network id of the source (H)eNB stored in the UE context. And if the UE moves within the local network, the old MME will send a local network interior movement indication to the new MME. The new MME decides to select the SGW.

As illustrated in FIG. 7, the process may include:

In operation 701, the UE sends TAU through a RRC message to the target (H)eNB.

Operation 702, the target (H)eNB sends TAU to a new MME via an S1 initial UE message or an uplink NAS transport message. Wherein the initial UE message or the uplink NAS transport message contains the local home network id of the target (H)eNB.

In operation 703, the new MME sends a context request message to the old MME.

There are two ways in this embodiment to inform the old MME of the identity of the local network to which the target (H)eNB belongs.

In an embodiment, via the context request message. The context request message contains the local home network id of the target (H)eNB.

In an embodiment, via the context acknowledgment message in operation 705. The context acknowledgment message contains the local home network id of the target (H)eNB.

The old MME determines whether the UE has moved out of the local network according to a comparison result between the local home network id of the target (H)eNB received from the new MME and the local home network id of the source (H)eNB stored in the UE context. When the target (H)eNB does not belong to any local network, the target (H)eNB may not need to inform the new MME of the local network information. The new MME may not need to inform the old MME of the local network information. Without receiving the local network information from the new MME, the old MME would know that the UE has moved out of the local network. If the UE has moved out of the local network, the old MME will trigger a SIPTO bearer disconnection process.

Corresponding to the aforementioned embodiment, the old MME determines whether the UE has moved out of the local network to which the source base station belongs by adopting operations 701 to 703. If the UE has not move out of the local network to which the source base station belongs, i.e., the UE moves within this local network, the old MME will send a local network interior indication to the new MME. For example, the local network interior movement indication is sent to the new MME via operation 704 or via other messages.

In operation 704, the old MME sends a context response message to the new MME.

For solving a problem of existing systems, the context response message in this operation contains the identity of the local home network to which the source base station belongs or the local network interior movement indication. Wherein corresponding to the aforementioned embodiment, a local network interior indication is carried in the context response message in this operation. The new MME receives the indication, and then determines that the UE moves within the local network to which the source base station belongs. If the new MME does not receive this indication, it is determined that the UE has moved out of the local network to which the source base station belongs.

Corresponding to the aforementioned embodiment, the identity of the local work to which the source base station belongs is carried in the context response message in this operation. The old MME would obtain the identity of the local home network to which the source base station belongs according to an initial UE message, or an uplink NAS transport message, or a handover request acknowledgment message, or a handover notify message, or a path switch request message. The old MME would store the identity of the local home network of the source base station in the UE context thus the old MME obtains the identity of the local home network of the source base station. The new MME determines whether the target base station is in the local home network to which the source base station belongs according to the local home network id of the target base station received from the target base station and the local home network id of the source (H)eNB received from the old MME in this operation. Or the new MME knows whether the UE moves within the local network according to the local network interior movement indication. Therefore, a SIPTO bearer disconnection would be triggered correctly or the SGW selection process can be performed.

If it is determined that the UE moves within the local home network through the ways described above, the target MME may not select a new SGW for the UE. If the UE has moved out of the local home network, the target MME can select a new SGW for the UE.

In operation 705, the new MME sends a context acknowledgment message to the old MME.

In operation 706, the new MME sends TAU through an S1 message to the target (H)eNB.

In operation 707, the target (H)eNB sends the TAU through an RRC message to the UE.

Thereafter, the flow depicted in FIG. 7 may terminate.

Figure 8:
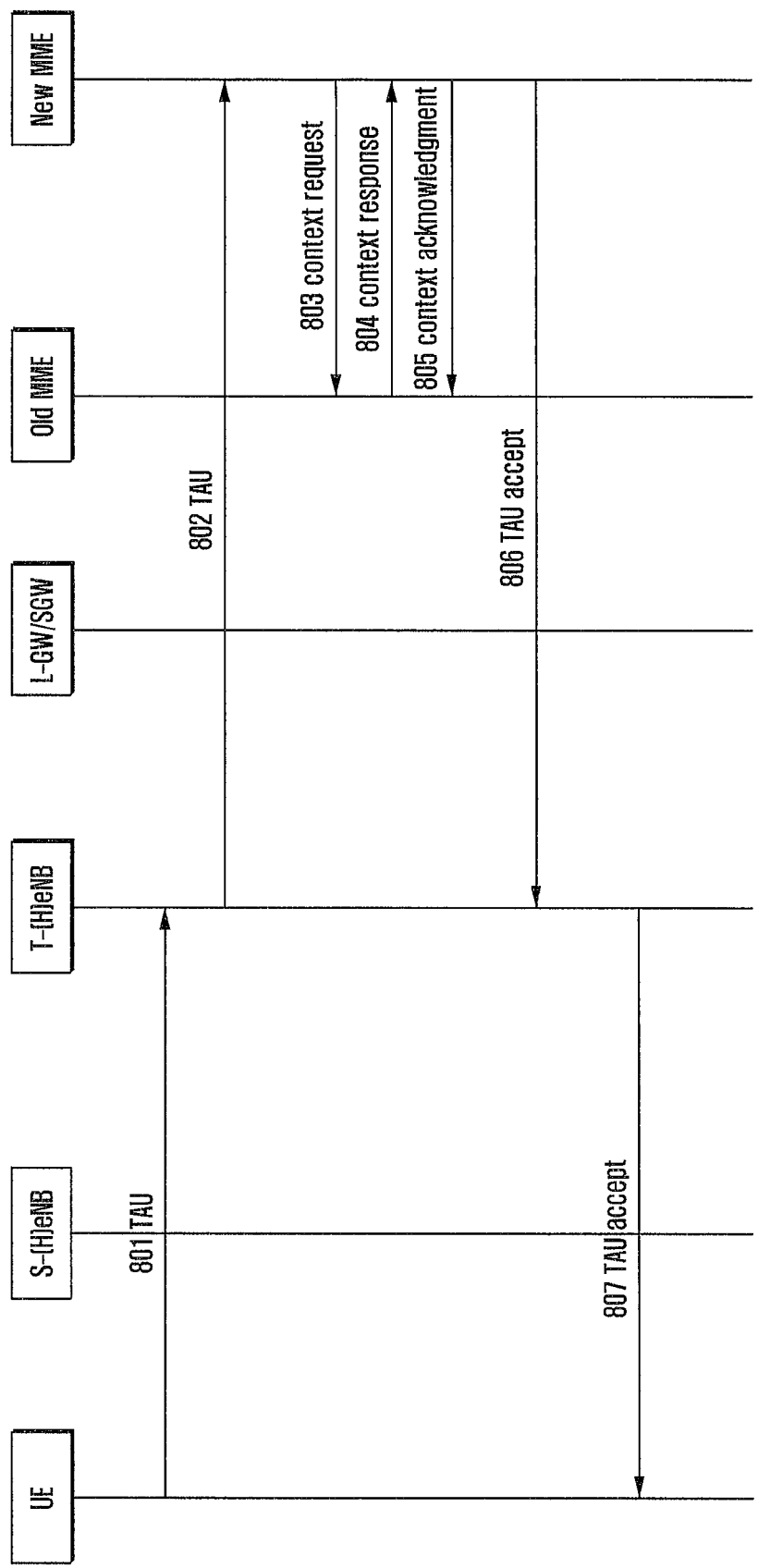
FIG. 8 illustrates a process for supporting selected IP traffic offload (SIPTO) according to an embodiment of the present disclosure.

FIG. 8 illustrates a process for supporting selected IP traffic offload (SIPTO) according to an embodiment of the present disclosure. In this embodiment, in the process of the TAU, the old MME sends the local home network id of the source (H)eNB to the new MME. The new MME may determine whether the UE has moved out of the local home network to which the source base station belongs according to a comparison result between the local home network id of the source (H)eNB and the local home network id of the target (H)eNB. If the UE has moved out, the new MME will send a SIPTO bearer disconnection indication to the old MME. Therefore, the old MME may trigger the SIPTO bearer disconnection process. This embodiment can solve a problem of existing systems. The new MME determines whether the target base station is in the local home network to which the source base station belongs according to the local home network id of the target base station received from the target base station and the local home network id of the source base station received from the old MME, thereby deciding to select the SGW. For example, if the UE moves in the local home network, the target MME may not select a new SGW for the UE. And if the UE has move out of the local home network, the target MME can select a new SGW for the UE. As illustrated in FIG. 8, the process may include:

Operations 801 to 802 are the same with operations 701 to 702. Therefore operations 801 to 802 will not be described here redundantly.

In operation 803, the new MME sends a context request message to the old MME.

In operation 804, the old MME sends a context response message to the new MME. The message contains an identity of the local home network to which the source (H)eNB belongs. The old MME would obtain the local home network id of the source (H)eNB according to an initial UE message, or an uplink NAS transport message, or a handover request acknowledgment message, or a handover notify message, or a path switch request message. The old MME would store the identity of the local home network of the source (H)eNB in the UE context.

The new MME determines whether the UE has moved out of the local home network to which the source base station belongs according to a comparison result between the local home network id of the source (H)eNB and the local home network id of the target (H)eNB. If the new MME does not receive the local network identity from the target (H)eNB, it can be determined that the (H)eNB does not belong to any local home network. The MME can determine that the UE has moved out of the local home network.

When the UE has moved out of the local home network, the new MME sends a SIPTO bearer release indication to the old MME.

To solve a problem of existing systems, this embodiment adopts the ways of operations 801 to 804, the new MME determines whether the UE has moved out of the local home network to which the source base station belongs, thereby performing a SGW selection.

For example, if the UE moves in the local home network, the new MME may not select a new SGW for the UE. And if the UE has move out of the local home network, the target MME can select a new SGW for the UE.

In operation 805, the new MME sends a context acknowledgment message to the old MME, and the message contains a SIPTO bearer release indication. The new MME may also send a SIPTO bearer release indication to the old MME via other existing messages or a new message.

Operations 806 to 807 are the same with operations 706 to 707. Therefore operations 806 to 807 will not be described here redundantly.

Thereafter, the flow depicted in FIG. 8 may terminate.

Figure 9:
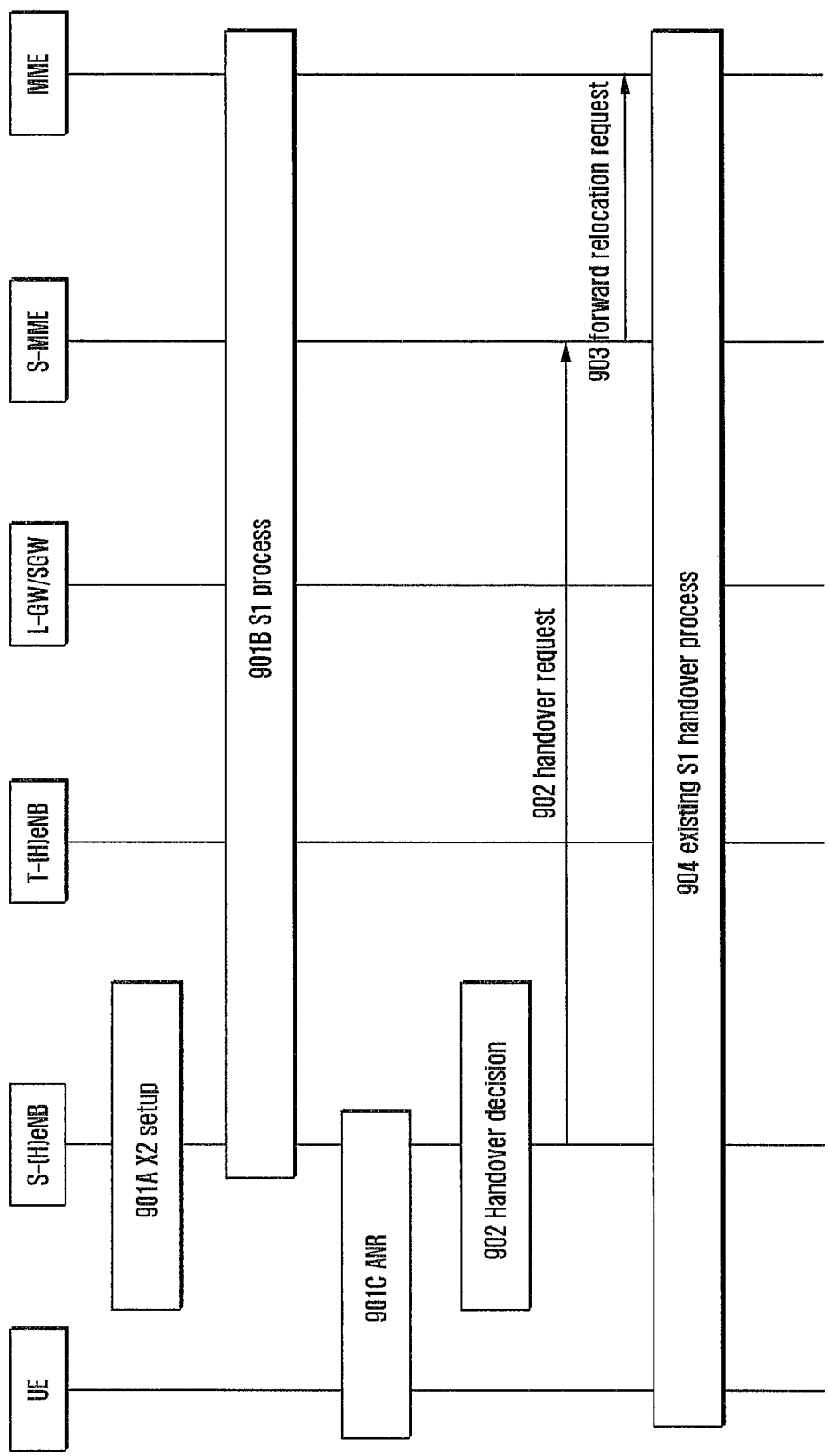
FIG. 9 illustrates a process for supporting selected IP traffic offload (SIPTO) according to an embodiment of the present disclosure.

FIG. 9 illustrates a process for supporting selected IP traffic offload (SIPTO) according to an embodiment of the present disclosure. In this embodiment, the source (H)eNB sends the local home network id of the target (H)eNB to the source MME, so that the source MME can determine whether it may need to trigger a SIPTO bearer disconnection process according to this information and the local home network id of the source (H)eNB. In this embodiment, the source (H)eNB sends the local home network id of the target (H)eNB to the source MME. The source MME sends local network identities in which the source base station and the target base station are located to the target MME, and the target MME judges whether the UE moves within the local network, and performs a correct SGW selection. For example, if the UE moves in the local network, the target MME may not select a new SGW for the UE. And if the UE has move out of the local network, the target MME can select a new SGW for the UE. Or the source (H)eNB sends the local home network id of the target (H)eNB to the source MME, and the source MME determines whether the UE moves within the local network according to the local home network id of the source base station and the local home network id of the target base station, and if it does, the source MME will send a local network interior movement indication to the target MME. If the target MME receives the indication information of local network interior movement, the target MME may not select a new SGW for the UE. As illustrated in FIG. 9, the process may include:

Operation 901, the source (H)eNB acquires the local home network id of the target (H)eNB.

Wherein the source (H)eNB has four ways to obtain the local home network id of the target (H)eNB:

In an embodiment, the source (H)eNB may obtain the local home network id of the target (H)eNB via an X2 setup process as illustrated in operation 901A. In the X2 setup process between the source (H)eNB and the target (H)eNB, the local home network id of the target (H)eNB can be obtained via an X2 setup request or an X2 setup response message;

In an embodiment, the source (H)eNB may obtain the local home network id of the target (H)eNB via an S1 establishment process as illustrated in operation 901B. For example, the identity of the local network in which one (H)eNB is located can be sent to another (H)eNB via an eNB configuration handover and an MME configuration transfer process or other S1 messages;

In an embodiment, the source (H)eNB may obtain the local home network id of the target (H)eNB via an ANR process as illustrated in operation 901C. The target (H)eNB broadcasts the identity of the local network in which its cell is located. The UE obtains the local home network id of the target (H)eNB from the system information block SIB broadcast by the target (H)eNB, and the UE sends the local home network id of the target (H)eNB to the source (H)eNB;

In an embodiment, the source (H)eNB may obtain via the configuration of the operation and maintenance center (OAM).

The source (H)eNB can also obtain the local home network id of the target (H)eNB in other ways without affecting the primary content of the present disclosure.

When the target (H)eNB does not belong to any local network, the identity of the local network of the target base station may not be included in the process of the four ways described above.

In operation 902, the source (H)eNB sends a handover request to the source MME. The message contains an identity of the local network where the target (H)eNB is located. When the target (H)eNB does not belong to any local network, the identity of the local network of the target base station may not be included in the message.

The source MME determines whether the UE has moved out of the local network according to a comparison result between the local home network id of the source (H)eNB and the local home network id of the target (H)eNB. If the UE has moved out of the local network, the source MME will trigger a SIPTO bearer disconnection process. In an embodiment, when the UE initially accesses the source (H)eNB, the MME could obtain the local home network id of the source (H)eNB according to an initial UE message received, or a path switch request message, or a handover request acknowledgement message or a handover notify message. The MME would store the identity of the local network in the UE context. The MME may also obtain the local home network id of the source (H)eNB through the handover request message in this operation. Or the source (H)eNB obtains the local home network id of the target (H)eNB through operation 402. The source (H)eNB determines whether the UE moves within the local network or has moved out of the local network. Then the source (H)eNB may send information about whether the UE moves within the local network or has moved out of the local network to the MME. The MME then decides whether to trigger a SIPTO bearer disconnection process.

If the source MME does not receive the local home network id of the target (H)eNB from the source (H)eNB, and the source (H)eNB is in the local network, the target (H)eNB then does not belong to the local network. The source MME gets to know that UE has moved out of the local network. The source MME triggers a SIPTO bearer disconnection process.

In operation 903, the source MME sends a forward relocation request message to the target MME.

The source MME sends identities of the local networks in which the source base station and the target base station are located to the target MME, and the target MME determines whether the UE moves within the local network. For example, if the UE moves in the local network, the target MME may not select a new SGW for the UE. And if the UE has move out of the local network, the target MME can select a new SGW for the UE.

Or when the source MME acquires or judges that the UE moves within the local network in operation 902, the source MME sends one local network interior movement indication to the target MME. If the target MME receives the indication information of local network interior movement, the target MME may not select a new SGW for the UE.

In operation 904, the existing S1 handover process is performed, which will not be described here redundantly.

Thereafter, the flow depicted in FIG. 9 may terminate.

Figure 10:
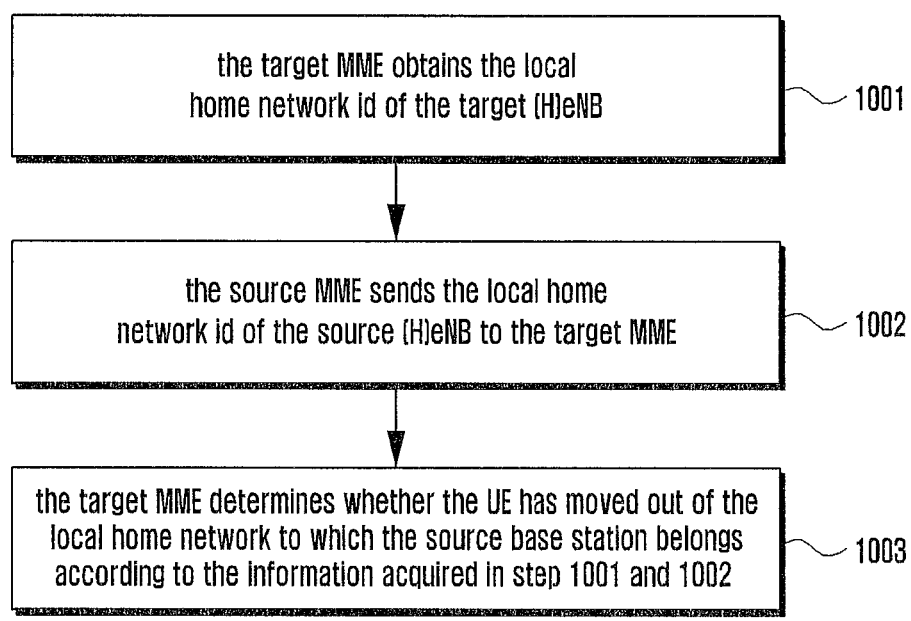
FIG. 10 illustrates a process for supporting selected IP traffic offload (SIPTO) according to an embodiment of the present disclosure.

FIG. 10 illustrates a process for supporting selected IP traffic offload (SIPTO) according to an embodiment of the present disclosure. As illustrated in FIG. 10, the process may include:

Operation 1001, the target MME obtains the local home network id of the target (H)eNB.

The target MME can acquire the local home network id of the target (H)eNB via the a path switch request message of operation 306, or a handover request acknowledgement message of operation 404, or a handover notify message of operation 408, or an initial UE message or an uplink NAS transport message of operation 702.

Operation 1002, the source MME sends the local home network id of the source (H)eNB to the target MME.

The source MME obtains the local home network id of the source base station from the source base station. The way that the source MME obtains the local home network id of the source base station can be any way described above in the embodiments of FIG. 3 to FIG. 9. The source MME sends the local home network id of the source (H)eNB to the target MME via the forward relocation request of operation 503, or the forward relocation complete acknowledgement of operation 512, or the context response message of operation 704, or other existing messages, or a new message.

Wherein, operation 1001 and operation 1002 are in no absolute chronological order.

Operation 1003, the target MME determines whether the UE has moved out of the local home network to which the source base station belongs according to the information acquired in operation 1001 and 1002.

According to that the local home network id of the target (H)eNB and the local home network id of the source (H)eNB are different, or that the target (H)eNB is not in a local home network, the target MME knows that the UE has moved out of the local home network of the source (H)eNB, and the target MME triggers a bearer disconnection process. According to that the local home network id of the target (H)eNB and the local home network id of the source (H)eNB are the same, the target MME determines that the UE moves within the local home network. The target MME can correctly select SGW. For example, if the UE moves within the local home network, the target MME may not select a new SGW for the UE. And if the UE has move out of the local home network, the target MME can select a new SGW for the UE.

Thereafter, the flow depicted in FIG. 10 may terminate.

An embodiment of supporting SIPTO traffic deactivation provides a process of distinguishing whether the established bearer is LIPA or SIPTO. This embodiment includes: MME informs the base station whether the established bearer is LIPA or SIPTO. When the UE handovers to a cell of other base station, the base station will trigger a corresponding bearer deactivation process according to whether the established bearer is LIPA or SIPTO.

Figure 11:
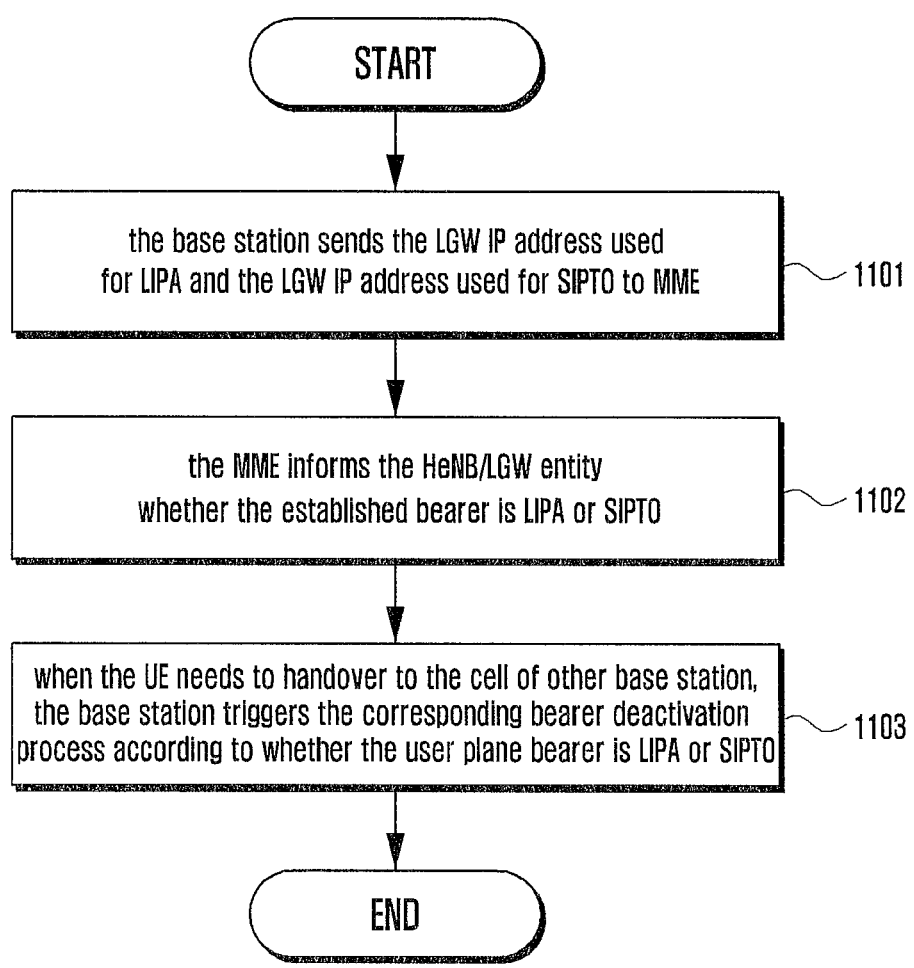
FIG. 11 illustrates a process for supporting selected IP traffic offload (SIPTO) according to an embodiment of the present disclosure.

FIG. 11 illustrates a process for supporting selected IP traffic offload (SIPTO) according to an embodiment of the present disclosure. As illustrated in FIG. 11, the process may include:

Operation 1101, the base station sends the LGW IP address used for LIPA and the LGW IP address used for SIPTO to MME. For example, the base station may send the information to MME via an initial UE message or an uplink NAS transport message. The MME knows whether the base station supports LIPA, and whether supports SIPTO according to the information described above.

Operation 1102, the MME informs the HeNB/LGW entity whether the established bearer is LIPA or SIPTO. There are two ways for the MME to inform the HeNB/LGW entity whether the established bearer is LIPA or SIPTO.

In an embodiment, when the MME sends a create session request message to the SGW, if a LIPA bearer is established, it is the LGW IP address used for LIPA contained in the message. If a SIPTO bearer is established, it is the LGW IP address used for SIPTO contained in the message. Accordingly the SGW sends a corresponding creation session request to the corresponding IP address. LGW determines whether the established bearer is established for LIPA, or established for SIPTO according to received IP address of the creation session request message. The LGW informs the HeNB that whether the bearer of the corresponding bearer identity is LIPA or SIPTO via internal signaling.

In an embodiment, when the MME is establishing a LIPA bearer for the UE, the transmission layer address that it sends to the corresponding bearer of the base station via an S1 message (e.g., an initial context establishment request or an ERAB establishment request) is the LGW address used for LIPA. When the MME is establishing a SIPTO bearer for the UE, the transmission layer address that it sends to the corresponding bearer of the base station via a S1 message (e.g., an initial context establishment request or an ERAB establishment request) is the LGW address used for SIPTO. So that the base station knows that established bearer is a LIPA or a SIPTO. In an embodiment, the IP address that the initial context establishment request or the ERAB establishment request sends to the base station is the IP address of the SGW. The MME makes the base station know that the established bearer is LIPA via a correlation identification (Correlation ID), so that the base station knows the IP address of the corresponding bearer could be the IP address of the collocated LGW.

Operation 1103, when the UE may need to handover to a cell of another base station, the base station triggers the corresponding bearer deactivation process according to whether the bearer is LIPA or SIPTO. For a LIPA bearer, the base station sends an internal signaling to the collocated LGW before handover and the LGW triggers a PGW initiated bearer deactivation procedure. For a SIPTO bearer, after the handover is completed, when the source base station is releasing resources, the source base station sends internal signaling to the collocated LGW, and the LGW triggers a PGW initiated bearer deactivation procedure. Corresponding to the release of the SIPTO bearer, the source base station or the LGW can also set a timer. How to release the SIPTO bearer is not described herein.

Thereafter, the flow depicted in FIG. 11 may terminate.

Figure 12:
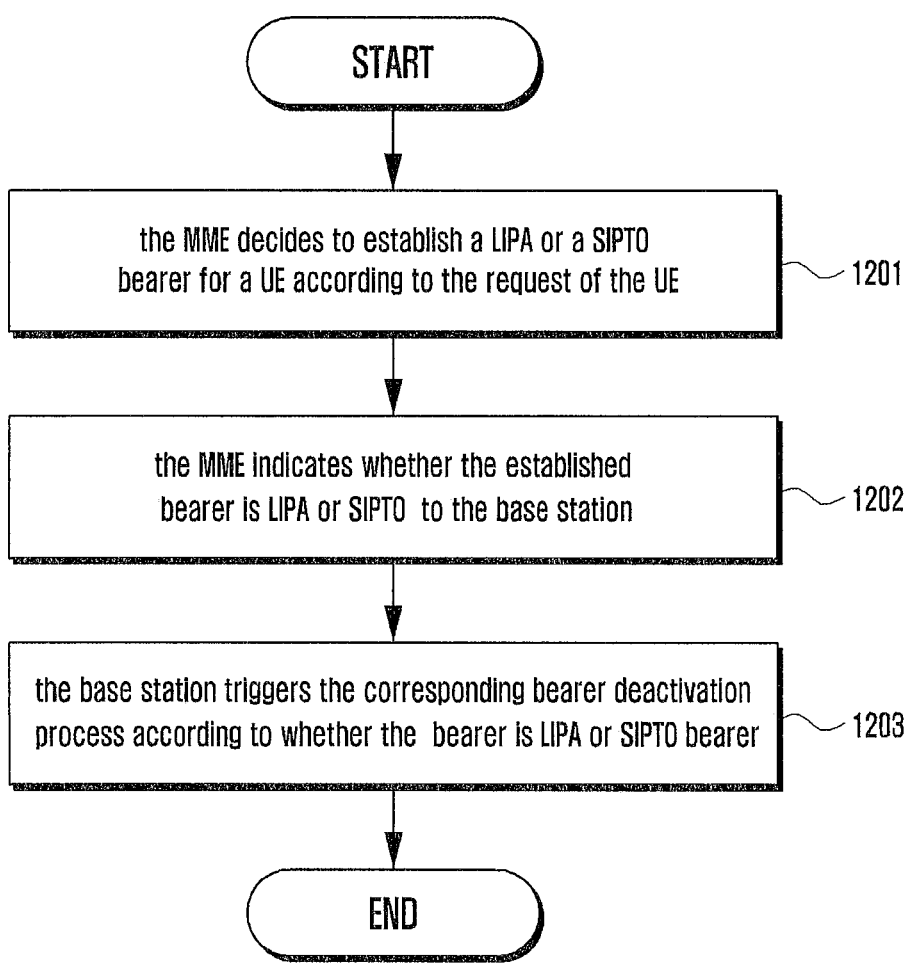
FIG. 12 illustrates a process for supporting selected IP traffic offload (SIPTO) according to an embodiment of the present disclosure.

FIG. 12 illustrates a process for supporting selected IP traffic offload (SIPTO) according to an embodiment of the present disclosure. As illustrated in FIG. 12, the process may include:

Operation 1201, the MME decides to establish a LIPA or a SIPTO bearer for a UE according to the request of the UE.

When the MME decides to establish a LIPA or SIPTO bearer for the UE, consider whether the base station that the UE accesses has the capability of supporting LIPA or SIPTO. While sending the LGW address to the MME, the base station informs the MME whether the base station supports LIPA or SIPTO or supports both. The base station can inform the MME the capability of the base station via different LGW IP address or a LIPA or SIPTO indication.

Operation 1202, when sending the S1 bearer setup message (e.g. an initial context setup request or an ERAB setup request message) to the base station, the MME includes the indication whether the established bearer is LIPA or SIPTO in the message. There are two ways for the MME to inform the HeNB whether the established bearer is for LIPA or SIPTO.

In an embodiment, corresponding to the LIPA bearer, use the existing Correlation ID (i.e. the Correlation ID in the 3GPP TS36.413 protocol), and corresponding to the SIPTO bearer, add new Correlation ID for SIPTO, i.e. the Correlation ID used for SIPTO. Accordingly, the base station will know whether the established bearer is LIPA or SIPTO according to the Correlation ID received.

In an embodiment, the S1 message may only contain one Correlation ID, and if the established bearer is SIPTO, add one SIPTO indication, thus the base station will know that the established bearer is a SIPTO rather than a LIPA. When there is no such SIPTO indication, the established bearer is a LIPA bearer.

Operation 1203 is the same with operation 1103. Therefore operation 1203 will not be described here redundantly.

Thereafter, the flow depicted in FIG. 12 may terminate.

Figure 13:
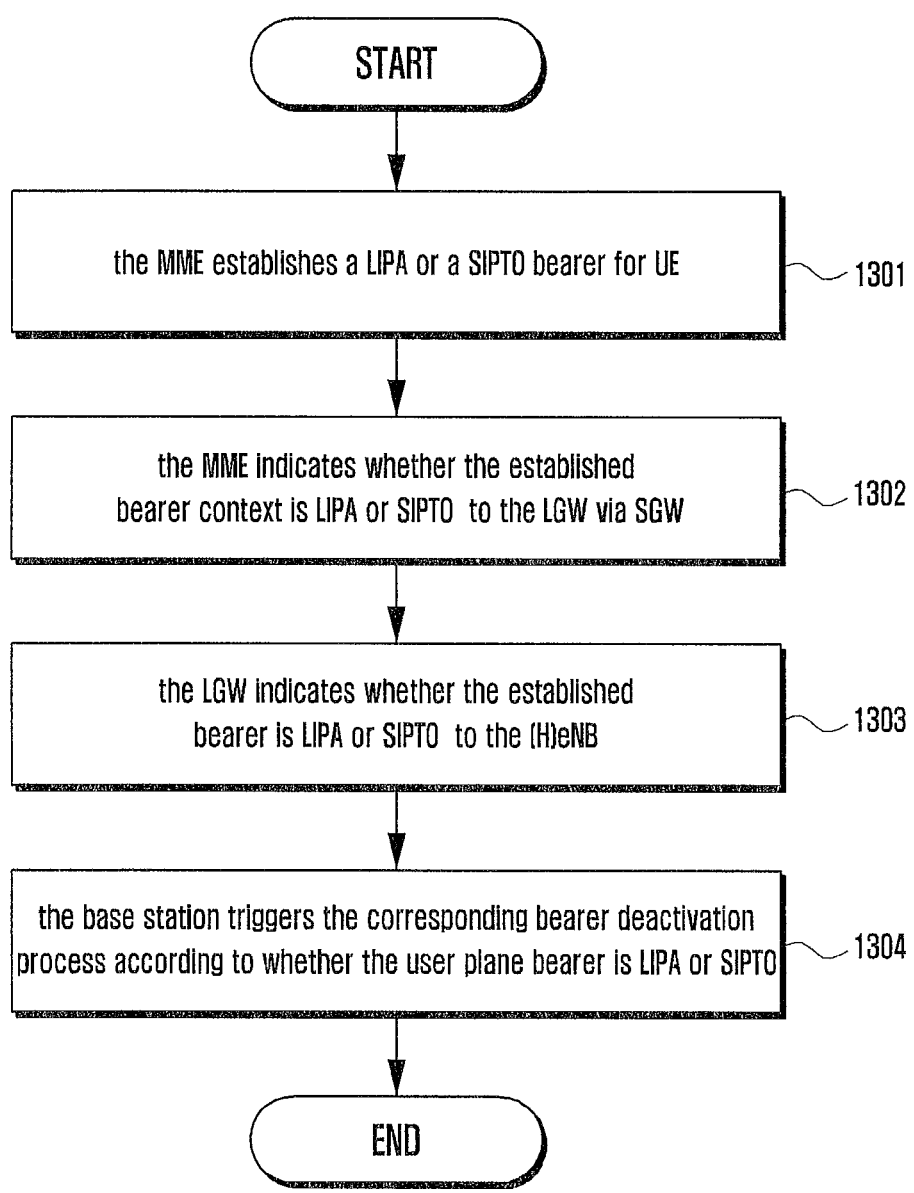
FIG. 13 illustrates a process for supporting selected IP traffic offload (SIPTO) according to an embodiment of the present disclosure.

FIG. 13 illustrates a process for supporting selected IP traffic offload (SIPTO) according to an embodiment of the present disclosure. As illustrated in FIG. 13, the process may include:

Operation 1301 is the same with operation 1201. Therefore operation 1301 will not be described here redundantly.

In operation 1302, there are two ways to make the LGW know whether the established bearer is a LIPA or a SIPTO, which include:

In an embodiment, as shown in operation 1302, when sending a create session request message to the SGW, the MME indicates whether the established bearer is LIPA or SIPTO, and the SGW sends the corresponding information to LGW.

In an embodiment, operators pre-configure in the LGW which APNs or PDNs correspond to LIPA traffic and which APNs or PDNs correspond to SIPTO traffic. In this way, in operation 1302, the MME sends the existing creation session request to the SGW. The SGW sends the existing creation session request message to the LGW. And without requiring the MME to indicate to the LGW via the SGW whether the bearer established is a LIPA bearer or a SIPTO bearer, the LGW determines whether the established bearer is LIPA or SIPTO in accordance with the pre-configuration according to the APN or PDN in the received create session request.

Operation 1303, the LGW informs the (H)eNB that the established bearer is a LIPA or a SIPTO (according to the bearer identity) via internal signaling.

Operation 1304 is the same with operation 1103. Therefore operation 1304 will not be described here redundantly.

Thereafter, the flow depicted in FIG. 13 may terminate.

Figure 14:
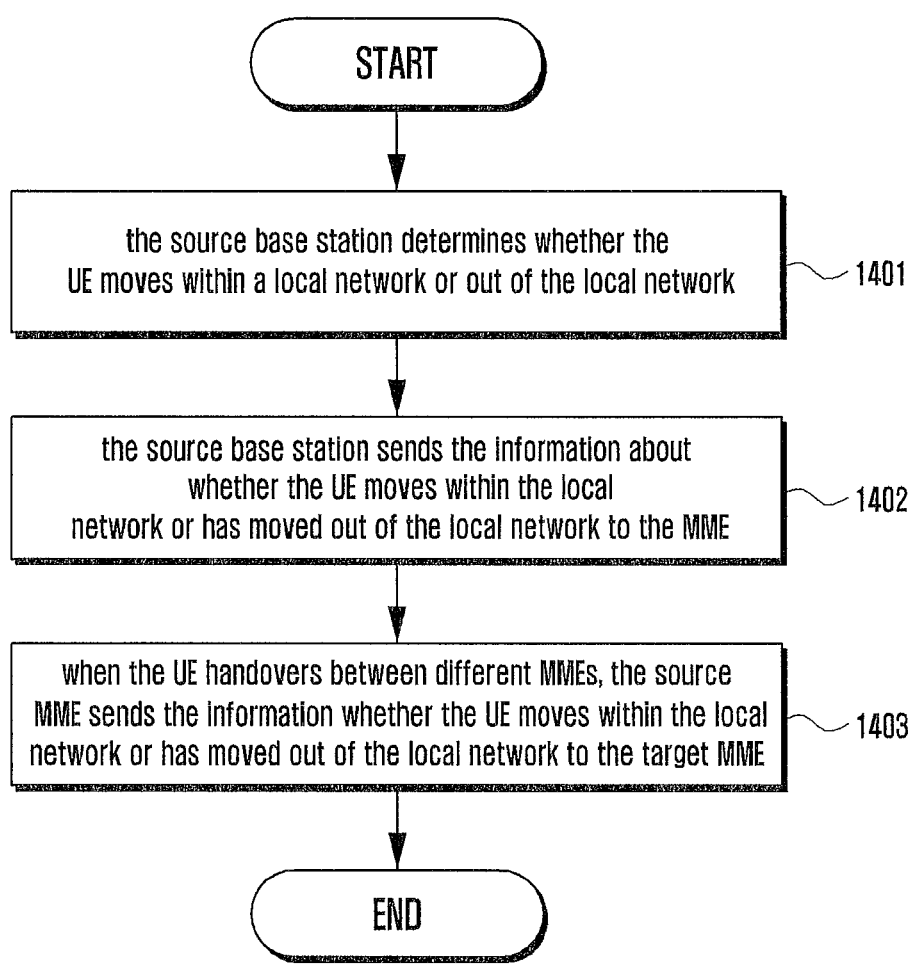
FIG. 14 illustrates a process for supporting selected IP traffic offload (SIPTO) according to an embodiment of the present disclosure.

FIG. 14 illustrates a process for supporting selected IP traffic offload (SIPTO) according to an embodiment of the present disclosure. As illustrated in FIG. 14, the process may include:

In operation 1401, the source (H)eNB determines to initiate a handover of the UE. The source base station determines whether the UE moves within a local network or out of the local network. The source base station determines whether the UE moves within a local network or out of the local network through the following embodiments.

In an embodiment, the source base station determines whether the source base station and the target base station belong to the same local network via the configuration.

In another embodiment, the source base station obtains the local home network id of the target base station, and by comparing the local home network id of the source base station and the local home network id of the target base station, determines whether the UE moves within the local network or has moved out of the local network. There are four ways for the source (H)eNB to obtain the local home network id of the target (H)eNB, which include:

In an embodiment, the source (H)eNB may obtain the local home network id of the target (H)eNB via an X2 setup process. In the X2 setup process between the source (H)eNB and the target (H)eNB, the local home network id of the target (H)eNB can be obtained via an X2 setup request or an X2 setup response message;

In an embodiment, the source (H)eNB may obtain the local home network id of the target (H)eNB via an S1 process. For example, the identity of the local network in which one (H)eNB is located can be sent to another (H)eNB via an eNB configuration handover and an MME configuration transfer process or other S1 messages;

In an embodiment, the source (H)eNB may obtain the local home network id of the target (H)eNB via an automatic neighbor relation ANR process. The target (H)eNB broadcasts the identity of the local network in which its cell is located. The UE obtains the local home network id of the target (H)eNB from the system information block SIB broadcast by the target (H)eNB, and the UE sends the local home network id of the target (H)eNB to the source (H)eNB;

In an embodiment, the source (H)eNB may obtain via the configuration of the operation and maintenance center (OAM).

The source (H)eNB can also obtain the local home network id of the target (H)eNB in other ways without affecting the primary content of the present disclosure.

When the target (H)eNB does not belong to any local network, the identity of the local network of the target base station may not be included in the process of the four ways described above. When the messages do not include the identity of the local network of the target base station, the source base station knows that the target base station does not belong to any local network.

In operation 1402, the source base station sends the information about whether the UE moves within the local network or has moved out of the local network to the MME. The source base station may inform the MME of the information via a handover request message or other messages. In the embodiment of a handover in the same MME, if the UE moves within the local network, the MME will not trigger a SIPTO bearer deactivation process. If the UE has moved out of the local network, the MME will trigger a SIPTO bearer disconnection process. According to whether the UE moves within the local network, the MME correctly decides the SGW selection. For example, if the UE moves within the local network, the MME do not select a new SGW for the UE. If the UE has moved out of the local network, the MME can select a new SGW for the UE.

When moving between different MMES, according to the information whether the UE moves within the local network or has moved out of the local network received from the source base station, the source MME can determine whether to trigger the SIPTO bearer disconnection process.

In operation 1403, when the UE handovers between different MMEs, the source MME sends the information whether the UE moves within the local network or has moved out of the local network to the target MME. The source MME may send the information to the target MME via a forward relocation request message or other messages. The target MME determines the SGW selection based on the received information whether the UE moves within the local network or has moved out of the local network. The target MME performs the SGW selection according to the local home network id of the target base station. For example, if the UE moves within the local network, the target MME does not select a new SGW for the UE. If the UE has moved out of the local network, the target MME can select a new SGW for the UE.

Thereafter, the flow depicted in FIG. 14 may terminate.

Figure 15:
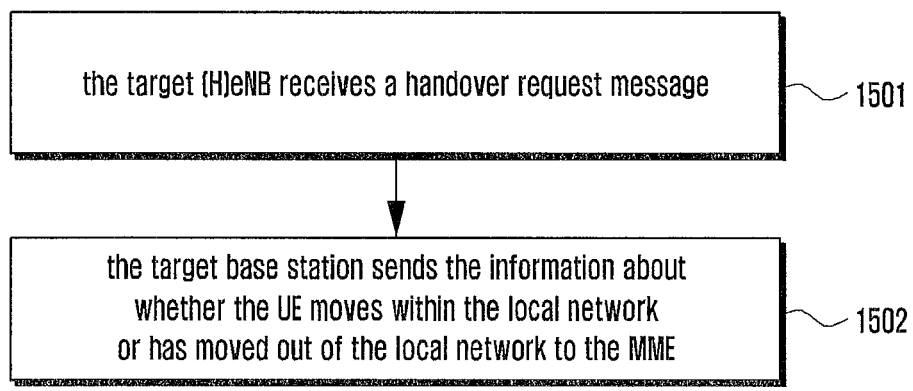
FIG. 15 illustrates a process for supporting selected IP traffic offload (SIPTO) according to an embodiment of the present disclosure.

FIG. 15 illustrates a process for supporting selected IP traffic offload (SIPTO) according to an embodiment of the present disclosure. As illustrated in FIG. 15, the process may include:

In operation 1501, the target (H)eNB receives a handover request message. The target base station determines whether the UE moves within the local network or has moved out of the local network. The target base station determines whether the UE moves within a local network or out of the local network through the following embodiments.

In an embodiment, the target base station determines whether the source base station and the target base station belong to the same local network via the configuration.

In another embodiment, the target base station obtains the local home network id of the source base station, and by comparing the local home network id of the source base station and the local home network id of the target base station, determines whether the UE moves within the local network or has moved out of the local network. There are five ways for the target (H)eNB to obtain the local home network id of the source (H)eNB, which include:

In an embodiment, the target (H)eNB may obtain the local home network id of the source (H)eNB via an X2 setup process. In the X2 setup process between the source (H)eNB and the target (H)eNB, the local home network id of the source (H)eNB can be obtained via an X2 setup request or an X2 setup response message;

In an embodiment, the target (H)eNB may obtain the local home network id of the source (H)eNB via an S1 process. For example, the identity of the local network in which one (H)eNB is located can be sent to another (H)eNB via an eNB configuration handover and an MME configuration transfer process or other S1 messages;

In an embodiment, the target (H)eNB may obtain the local home network id of the source (H)eNB via an automatic neighbor relation ANR process. The source (H)eNB broadcasts the identity of the local network in which its cell is located. The UE obtains the local home network id of the source (H)eNB from the system information block SIB broadcast by the source (H)eNB, and the UE sends the local home network id of the source (H)eNB to the target (H)eNB. Here the UE may be any UE other than the UE hindering from the source base station to the target base station.

In an embodiment, the target (H)eNB may obtain via the configuration of the operation and maintenance center (OAM).

Way five, the source base station sends the identity of the local network in which it is located to the target base station via a handover request message.

The target (H)eNB can also obtain the local home network id of the source (H)eNB in other ways without affecting the primary content of the present disclosure.

When the source (H)eNB does not belong to any local network, the identity of the local network of the source base station may not be included in the process of the five ways described above. When the messages do not include the identity of the local network, the target base station knows that the target base station does not belong to any local network.

In operation 1502, the target base station sends the information about whether the UE moves within the local network or has moved out of the local network to the MME. The target base station may inform the MME of the information via a path switch request message or other messages. The target base station may inform the MME of the local home network id of the target base station via a path switch request message or other messages. If the UE has moved within the local network, the MME will not trigger a SIPTO bearer disconnection process. If the UE has moved out of the local network, the MME will trigger a SIPTO bearer disconnection process. The MME determines the SGW selection based on the received information about whether the UE moves within the local network or has moved out of the local network. The MME performs the SGW selection according to the local home network id of the target base station. For example, if the UE moves within the local network, the MME will not select a new SGW for the UE. If the UE has moved out of the local network, the MME can select a new SGW for the UE.

Thereafter, the flow depicted in FIG. 15 may terminate.

Figure 16:
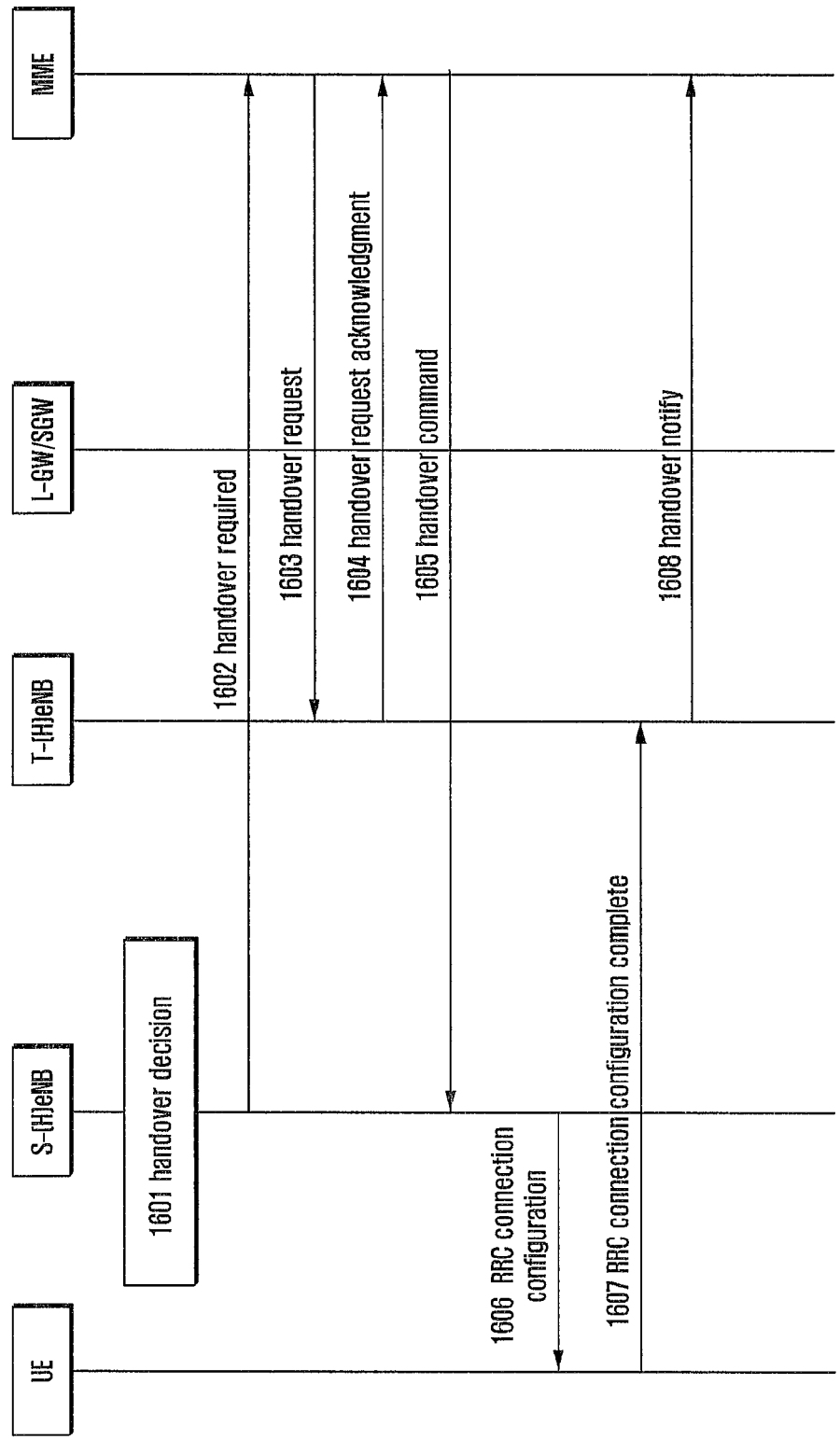
FIG. 16 illustrates a process for determining whether the UE has moved out of the local mobile network according to an embodiment of the present disclosure.

FIG. 16 illustrates a process for determining whether the UE has moved out of the local mobile network according to an embodiment of the present disclosure. As illustrated in FIG. 16, the process may include:

In operation 1601, the source (H)eNB decides to initiate a handover of the UE.

In operation 1602, the source (H)eNB sends a handover request to the MME. If the MME establishes a SIPTO bearer of local network for the UE, the MME will not reselect SGW for the UE, i.e., using the original SGW.

In operation 1603, the MME sends a handover request message to the target (H)eNB.

In operation 1604, the target (H)eNB sends a handover request acknowledgment message to the MME.

There are two ways in this embodiment for the target (H)eNB to inform the MME of the local home network id of the target base station.

In an embodiment, the target (H)eNB informs the MME of the local home network id of the target base station by including the identity of the local network in the handover request acknowledgement message.

In an embodiment, the target (H)eNB informs the MME of the local home network id of the target base station by including the identity of the local network in the handover notify message in operation 1608.

After obtaining the local home network id of the target base station from the target base station, the MME can determine whether the UE has moved out of the local network in which the source (H)eNB is located according to the local home network id of the source (H)eNB stored in the context of the Leif the UE has moved out of the local network, the MME will trigger a SIPTO bearer disconnection process.

If the target (H)eNB does not belong to any local network, the handover request acknowledgment message and the handover notify message will not contain the identity of the local network. The MME would get to know that the UE has moved out of the local network according to the local home network id of the source (H)eNB stored in the UE context and the fact that the target (H)eNB does not belong to the local network. Then the MME can initiate a SIPTO bearer disconnection process.

In an embodiment, when the UE initially accesses the source (H)eNB, the MME can obtain the local home network id of the source (H)eNB according to an initial UE message received, or an uplink NAS transport message, or a path switch request message, or a handover request acknowledgement message or a handover notify message. The MME could store the identity of the local network in the context of the Bethe MME may also obtain the local home network id of the source (H)eNB through operation 1602. Corresponding to this embodiment, the handover request message in operation 1602 could include the local home network id of the source (H)eNB.

In operation 1605, the MME sends a handover command message to the source (H)eNB.

Operations 1606 to 1607 are the same with operations 304 to 305. Therefore operations 1606 to 1607 will not be described here redundantly.

In operation 1608, the target (H)eNB sends a handover notify message to the MME. When informing the MME of the local home network id of the target (H)eNB by the target (H)eNB in this embodiment, the handover notify message may contain the identity of the local network, and the behavior of the MME is the same as that described in operation 1604, which will not be described here again.

Thereafter, the flow depicted in FIG. 16 may terminate.

Figure 17:
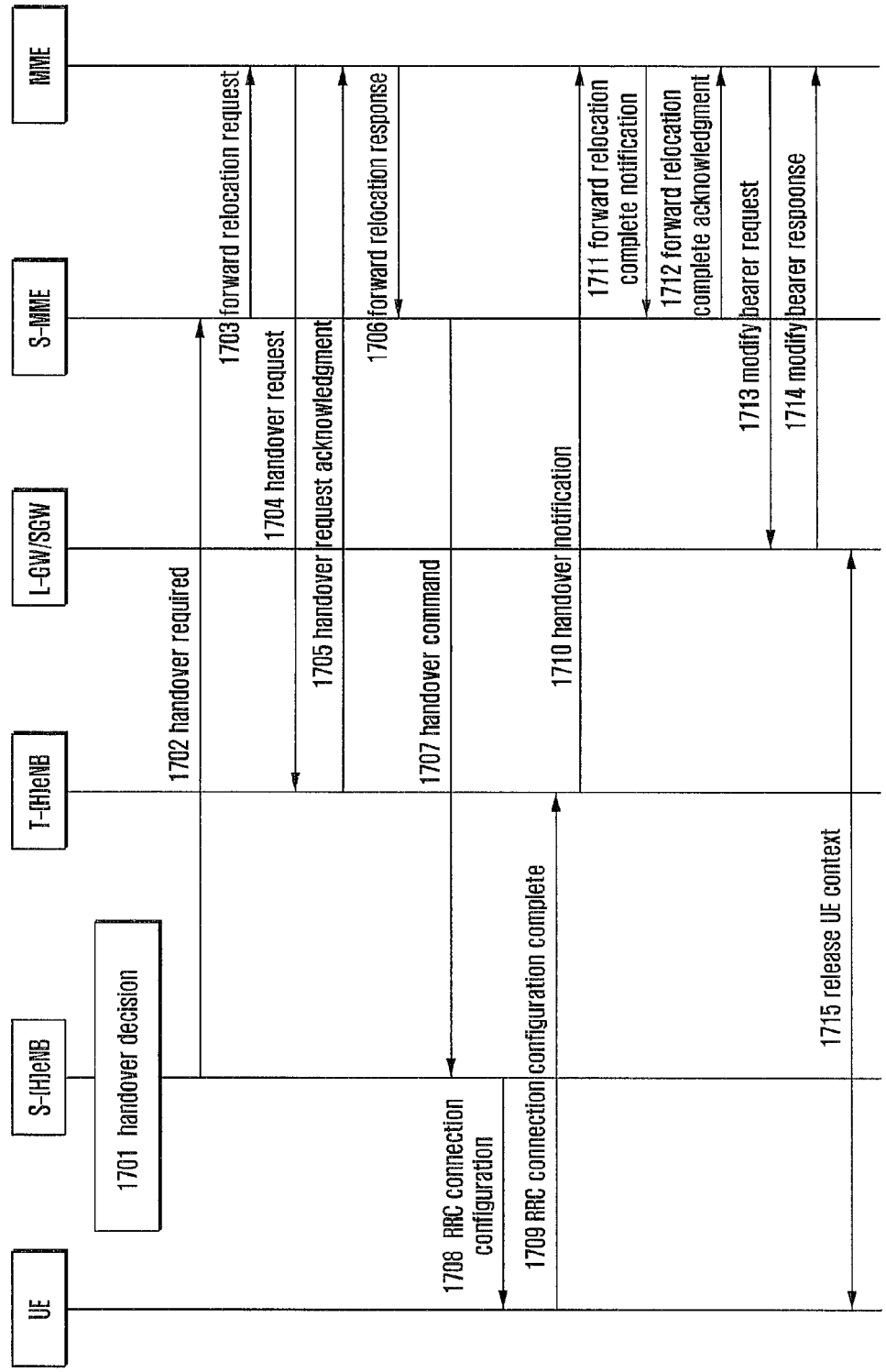
FIG. 17 illustrates a process for determining whether the UE has moved out of the local mobile network according to an embodiment of the present disclosure.

FIG. 17 illustrates a process for determining whether the UE has moved out of the local mobile network according to an embodiment of the present disclosure. As illustrated in FIG. 17, the process may include:

In operation 1701, the source (H)eNB decides to initiate a handover of the UE.

In operation 1702, the source (H)eNB sends a handover request to the source MME.

In operation 1703, the source MME sends a forward relocation request message to the target MME. The message contains an identity of the local network where the source base station is located. The source MME sends information about having established a SIPTO bearer of the local network for the UE to the target MME. The source MME may explicitly inform the target MME information about having established a SIPTO bearer of the local network for the UE or which bearer is the SIPTO bearer of the local network. The source MME may also inform the target MME the information about having established a SIPTO bearer of the local network for the UE by sending the identity of the local network of the source base station to the target MME. When the SIPTO bearer of the local network is established, the identity of the local network of the source base station will be included in the forward relocation request message. So that the target MME can be aware of the information about having established a local SIPTO traffic for the UE according to the local network identity included in the forward relocation request message. The target MME will not reselect SGW for the UE.

In operation 1704, the target MME sends a handover request message to the target (H)eNB.

In operation 1705, the target (H)eNB sends a handover request acknowledgment message to the target MME.

There are two ways in this embodiment for the target (H)eNB to inform the target MME of the local home network id of the target (H)eNB. Same as the description about FIG. 4, the two ways will be described in details.

In an embodiment, the target (H)eNB informs the target MME of the local home network id of the target (H)eNB via the handover request message.

In an embodiment, the target (H)eNB informs the target MME of the local home network id of the target (H)eNB via the handover notify message in operation 1710.

In operation 1706, the target MME sends a forward relocation response message to the source MME.

In operation 1707, the source MME sends a handover command message to the source (H)eNB.

Operations 1708 to 1710 are the same as operations 406 to 408. Therefore operations 1708 to 1710 will not be described here again.

In operation 1711, the target MME sends a forward relocation complete message to the source MME.

In operation 1712, the source MME sends a forward relocation complete acknowledgment message to the target MME.

Operation 1713, the target MME sends a modify bearer request message to an LGW/SGW.

Operation 1714, the LGW/SGW sends a modify bearer response message to the target MME.

Operation 1715, the source MME triggers a resource release process of the source (H)eNB.

The target MME determines whether the UE moves within the local network or has moved out of the local network according to the local home network id of the source base station received from the source MME and the local home network id of the target base station received from the target base station. If the UE has moved out of the local network, the target MME will trigger a SIPTO bearer deactivation process.

Thereafter, the flow depicted in FIG. 17 may terminate.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for supporting, by a mobility management entity (MME), a selected IP traffic offload (SIPTO) in a mobile communication system, the method comprising:
   transmitting, to a source base station, a bearer setup message including correlation identifier for the SIPTO if the SIPTO is supported with a collocated local gateway (LGW);
   acquiring a first local home network identifier (ID) of the source base station;
   receiving, from a target base station, a message including a second local home network ID of the target base station; and
   determining whether a user equipment (UE) has moved out of a local home network of the source base station and whether a serving gateway (SGW) relocation is needed based on the first local home network ID of the source base station and the second local home network ID of the target base station, and
   wherein a bearer deactivation procedure is triggered after a handover completion if the correlation identifier for the SIPTO is included in the bearer setup message; and
   wherein the bearer deactivation procedure is triggered before the handover completion if the correlation identifier for the SIPTO is not included in the bearer setup message.

2. The method of claim 1, further comprising, when the UE has moved out of the local home network of the source base station, initiating an SIPTO bearer disconnection process.

3. The method of claim 1, further comprising, when the DE has not moved out of the local home network of the source base station, maintaining the SGW used before the handover of the UE.

4. The method of claim 1, wherein acquiring the first local home network ID of the source base station comprises acquiring at least one of the first local home network ID of the source base station via at least one of an initial UE message, an uplink non-access stratum (NAS) transport message, a path switch request message, a handover request acknowledgement message, a handover notify message, or a handover required message.

5. The method of claim 1, wherein the source base station acquires the second local home network ID of the target base station via at least one of an X2 setup procedure, via a process of automatic neighbor relation (ANR), or from a configuration of an operation and maintenance (OAM) center, and the local home network ID of the target base station via an S1 procedure.

6. The method of claim 1, wherein the source base station transmits the second local home network ID of the target base station in a handover required message sent to the MME.

7. A method for supporting a selected IP traffic offload (SIPTO) by a source mobility management entity (MME) when a user equipment (UE) handovers from a source base station to a target base station while moving to another MME in a mobile communication system, the method comprising:
  transmitting, to the source base station, a bearer setup message including correlation identifier for the SIPTO if the SIPTO is supported with a collocated local gateway (LGW);
  receiving a message including a first local home network identifier (ID) of the target base station; and
  determining whether the UE has moved out of a local home network of the source base station and whether a serving gateway (SGW) relocation is needed based on a second local home network ID of the source base station and the first local home network ID of the target base station,
  wherein a bearer deactivation procedure is triggered after a handover completion if the correlation identifier for the SIPTO is included in the bearer setup message; and
  wherein the bearer deactivation procedure is triggered before the handover completion if the correlation identifier for the SIPTO is not included in the bearer setup message.

8. The method of claim 7, wherein receiving the first local home network ID of the target base station comprises:
  carrying, by the target base station, the first local home network ID of the target base station in a handover request acknowledgement message sent to a target MME; and
  acquiring the first local home network ID of the target base station in at least one of a forward relocation response message, a forward relocation complete notification message, or an S1 messages from the target MME.

9. The method of claim 7, wherein the source MME acquires the second local home network ID of the source base station via at least one of an initial UE message, an uplink NAS transport message, a path switch request message, a handover request acknowledgement message, a handover notify message, or a handover required message.

10. A method for supporting selected IP traffic offload (SIPTO) of a target mobility management entity (MME) when a user equipment (UE) handovers from a source base station to a target base station while moving between different MMEs in a mobile communication system, the method comprising:
  receiving a first local home network identifier (ID) of the source base station from a source MME;
  receiving a handover notify message including a second local home network ID of the target base station from the target base station; and
  determining whether the UE has moved out of a local home network of the source base station based on the first local home network ID of the source base station and the second local home network ID of the target base station,
  wherein a bearer setup message including correlation identifier for the SIPTO is transmitted from the source MME to the source base station if the SIPTO is supported with a collocated local gateway (LGW),
  wherein a bearer deactivation procedure is triggered after a handover completion if the correlation identifier for the SIPTO is included in the bearer setup message; and
  wherein the bearer deactivation procedure is triggered before the handover completion if the correlation identifier for the SIPTO is not included in the bearer setup message.

11. The method of claim 10, further comprising, when the UE has moved out of the local home network of the source base station, initiating an SIPTO bearer disconnection process or informing, by the target MME, the source MME to initiate the SIPTO bearer disconnection process.

12. The method of claim 10, wherein receiving the first local home network ID of the source base station from the source MME comprises acquiring the first local home network ID of the source base station in at least one of a forward relocation request message, a forward relocation complete message, or a context response message in a tracking area update (TAU) process from the source MME.

13. An apparatus, comprising:
  a transceiver configured to transmit and receive a signal; and
  a controller coupled to the transceiver, the controller is configured to:
  transmit, to a source base station, a bearer setup message including correlation identifier for a selected IP traffic offload (SIPTO) if the SIPTO is supported with a collocated local gateway (LGW),
    acquire a first local home network identifier (ID) of a source base station;
    receive, from a target base station, a message including a second local home network ID of a target base station; and
    determine whether a user equipment (UE) has moved out of a local home network of the source base station and whether a serving gateway (SGW) relocation is needed based on the first local home network ID of the source base station and the second local home network ID of the target base station,
  wherein a bearer deactivation procedure is triggered after a handover completion if the correlation identifier for the SIPTO is included in the bearer setup message and
  wherein the bearer deactivation procedure is triggered before the handover completion if the correlation identifier for the SIPTO is not included in the bearer setup message.

14. The apparatus of claim 13, wherein the controller is further configured to initiate a selected IP traffic offload (SIPTO) bearer disconnection process when the UE has moved out of the local home network of the source base station.

15. The apparatus of claim 13, wherein the controller is further configured to maintain the SGW used before the handover of the UE when the UE has not moved out of the local home network of the source base station.

* * * * *